US012708060B2

(12) United States Patent
Dillon et al.

(10) Patent No.: US 12,708,060 B2
(45) Date of Patent: Aug. 18, 2026

(54) ARTICULATED COMBINE HAVING REAR MODULE WITH SEEDBED PREPARATION MECHANISM

(71) Applicant: Tribine Industries, LLC, Logansport, IN (US)

(72) Inventors: Ben N. Dillon, Logansport, IN (US); Dillon M. Thompson, Burdett, KS (US)

(73) Assignee: Tribine Industries, LLC, Logansport, IN (US)

(*) Notice: Subject to any disclaimer, the term of this patent is extended or adjusted under 35 U.S.C. 154(b) by 0 days.

(21) Appl. No.: 19/218,342

(22) Filed: May 25, 2025

(65) Prior Publication Data

US 2025/0311652 A1 Oct. 9, 2025

Related U.S. Application Data

(63) Continuation-in-part of application No. 18/802,549, filed on Aug. 13, 2024, now Pat. No. 12,329,048.

(Continued)

(51) Int. Cl.
*A01B 33/02* (2006.01)
*A01B 33/08* (2006.01)
(Continued)

(52) U.S. Cl.
CPC .......... *A01B 33/024* (2013.01); *A01B 33/082* (2013.01); *A01B 63/32* (2013.01);
(Continued)

(58) Field of Classification Search
CPC ..... A01B 33/024; A01B 33/082; A01B 63/32; A01C 5/064; A01C 5/068; A01C 7/06
See application file for complete search history.

(56) References Cited

U.S. PATENT DOCUMENTS

| | | | |
|---|---|---|---|
| 1,509,403 | A | 9/1924 | Howard et al. |
| 2,174,136 | A | 9/1939 | Patty |

(Continued)

FOREIGN PATENT DOCUMENTS

| | | | |
|---|---|---|---|
| DE | 4325469 | 2/1995 | |
| JP | 4521075 B2 * | 8/2010 | ............... A01C 7/00 |
| WO | 2006074667 | 7/2006 | |

OTHER PUBLICATIONS https://www.yetterco.com/products/11-plantermount-row-cleaners, “2967 Screw Adjust Row Cleaner”, Aug. 31, 2021.

(Continued)

*Primary Examiner* — Matthew R Buck
(74) *Attorney, Agent, or Firm* — Emerson, Thomson & Bennett, LLC; Roger D. Emerson; Peter R. Detorre

(57) ABSTRACT

A rear module, as illustrated with tanks, seed blowers, and transfer pump for fertilizer is mounted on the existing design frame, axle, and steering system; but it is a separate, distinct module. The planting module and the harvesting module must be disconnected from the common front module power unit and switched for planting row crops or harvesting. The harvesting configuration can have an attachment to the header to seed non row crops, such as, a cover crop like rye or canola. Such rear module can be the rear unit of an articulated vehicle, such as a harvester.

24 Claims, 15 Drawing Sheets

Related U.S. Application Data

(60) Provisional application No. 63/519,575, filed on Aug. 15, 2023.

(51) Int. Cl.
*A01B 63/32* (2006.01)
*A01C 5/06* (2006.01)
*A01C 7/06* (2006.01)

(52) U.S. Cl.
CPC .............. *A01C 5/064* (2013.01); *A01C 5/068* (2013.01); *A01C 7/06* (2013.01)

(56) References Cited

U.S. PATENT DOCUMENTS

| | | | | |
|---|---|---|---|---|
| 2,749,696 | A | 6/1956 | Innes | |
| 3,680,291 | A | 8/1972 | Soteropulos | |
| 3,717,272 | A | 2/1973 | Chartier et al. | |
| 4,317,326 | A | 3/1982 | Riedinger | |
| 4,411,581 | A | 10/1983 | Niewold | |
| 4,412,587 | A * | 11/1983 | van der Lely | A01B 33/021 172/123 |
| 4,414,794 | A | 11/1983 | Riedinger | |
| 4,415,303 | A | 11/1983 | Westendorf et al. | |
| 4,515,311 | A * | 5/1985 | Takata | E03F 7/10 239/172 |
| 4,565,257 | A | 1/1986 | Hanson | |
| 4,583,905 | A | 4/1986 | Scherr | |
| 4,590,739 | A | 5/1986 | Abatti et al. | |
| 4,720,119 | A | 1/1988 | Ritter | |
| 4,768,802 | A | 9/1988 | Winkler | |
| 5,244,226 | A | 9/1993 | Bergh | |
| 5,417,299 | A | 5/1995 | Pillar et al. | |
| 5,535,688 | A * | 7/1996 | Kaufman | A01D 43/12 172/474 |
| 5,904,365 | A | 5/1999 | Dillon | |
| 6,012,272 | A | 1/2000 | Dillon | |
| 6,125,618 | A | 10/2000 | Dillon | |
| 6,233,911 | B1 | 5/2001 | Dillon | |
| 6,339,917 | B1 | 1/2002 | Dillon et al. | |
| 6,484,485 | B2 | 11/2002 | Dillon | |
| 6,604,995 | B2 | 8/2003 | Dillon | |
| 6,606,844 | B2 | 8/2003 | Dillon | |
| 6,708,631 | B1 * | 3/2004 | McQuinn | A01C 15/04 222/129 |
| 6,910,845 | B2 | 6/2005 | Dillon | |
| 7,143,863 | B2 | 12/2006 | Dillon | |
| 7,553,228 | B2 | 6/2009 | Dillon | |
| RE42,036 | E | 1/2011 | Dillon | |
| 8,286,984 | B2 | 10/2012 | Dillon | |
| 8,292,008 | B2 | 10/2012 | Dillon | |
| 8,435,104 | B2 | 5/2013 | Dillon | |
| 9,723,773 | B2 | 8/2017 | Jordan | |
| 9,901,030 | B2 | 2/2018 | Matousek et al. | |
| 10,231,371 | B2 | 3/2019 | Dillon | |
| 10,244,685 | B2 | 4/2019 | Matousek et al. | |
| 10,257,977 | B2 | 4/2019 | Nelson et al. | |
| 10,492,363 | B2 | 12/2019 | Matousek et al. | |
| 10,849,276 | B2 | 12/2020 | Matousek et al. | |
| 12,329,048 | B2 * | 6/2025 | Dillon | A01B 63/32 |
| 2002/0011057 | A1 | 1/2002 | Dillon | |
| 2010/0267432 | A1 | 10/2010 | Roberge et al. | |
| 2014/0262370 | A1 | 9/2014 | Kohn et al. | |
| 2017/0142901 | A1 | 5/2017 | Herrman et al. | |
| 2018/0051513 | A1 | 2/2018 | Matousek et al. | |
| 2019/0350124 | A1 * | 11/2019 | Pitt | A01C 7/006 |
| 2020/0100418 | A1 * | 4/2020 | Kornecki | A01B 33/082 |
| 2021/0127552 | A1 | 5/2021 | Hubner et al. | |
| 2023/0104234 | A1 | 4/2023 | Dillon et al. | |
| 2024/0114830 | A1 | 4/2024 | Dillon et al. | |
| 2025/0057062 | A1 | 2/2025 | Dilion | |

OTHER PUBLICATIONS

International Search Report and Written Opinion for PCT App. No. PCT/US23/72687 mailed Dec. 14, 2023.

International Search Report and Written Opinion for PCT App. No. PCT/US2023079977 mailed Feb. 2, 2024.

* cited by examiner

ARTICULATED COMBINE HAVING REAR MODULE WITH SEEDBED PREPARATION MECHANISM

CROSS-REFERENCE TO RELATED APPLICATIONS

This application claims benefit of U.S. Provisional No. 63/519,575 filed Aug. 15, 2023.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND

The present disclosure relates to grain harvesting and more particularly to a combine that can efficiently accomplish several functions now being done by several different implements being dragged across a field, often in a long train. It further relates to improved methods for tilling, planting and fertilizing seed.

It is desirable to facilitate carbon sequestration and increase the organic matter in the soil by reducing tillage and the number of trips across the field by combines and implements to grow and harvest a crop.

Current farming machinery requires approximately three or four passes across the field to complete operations related to tilling the seedbed, planting the crop and applying fertilizer. Considering the increasingly limited supply and increasing price of diesel fuel, performing several operations to complete these tasks generates significant fuel, labor and equipment costs in the farming industry. The solution provided herein is capable of capable of reducing the amount of diesel fuel required to grow corn and soybeans by over 50% which will result in approximately $75,000 annual savings in fuel cost at $5 per gallon for the average U.S. corn belt farmer plus additional savings in labor and equipment costs. Moreover, row clearing devices that are only powered by ground contact tend not to be able to cope with heavy residue and stop rotating and plug up with residue. This requires the operator to stop the machine and clean out the plug of residue and soil. Seedbed preparation devices driven only by ground contact generally do not generate enough torque to chop heavy crop residue, such as corn stalks.

The present disclosure resolves these issues by providing row units mounted on the front end of a farming vehicle and on a rear end of a rear module capable of tilling, planting and fertilizing seed in a single pass across the field.

BRIEF SUMMARY OF THE INVENTION

The present disclosure has elements that are ground driven by engaging the soil passing under the machine. It also has elements that are powered by a mobile source moving with the machine. This provides the ability to engage the soil and residue at a speed directly proportional to the velocity over the ground of the machine and simultaneously engage the soil and residue at speeds different than ground speed of the machine.

The present disclosure is directed towards these two objectives. It prepares the seedbed for planting crops during the same process and trip across the field that is planting the seeds in the ground to germinate and grow. It also effectively deals with heavy residue left on the ground from the previously harvested crop, such as corn, by clearing residue from a narrow path for the new crop to be planted. The residue is both chopped into smaller pieces and pushed aside from the new seedbed. As only one example the new seedbed may be in the range of, say, for example, 100 millimeters wide.

In a preferred embodiment, a single thin ground powered cutting disc oriented to cut longitudinally is located centrally on the same shaft as two adjacent mechanically powered rotating cutting blades that are shaped to fluff the soil that will be the seedbed and chop residue still in its path while also moving it aside. The cutting disc ensures that any residue disposed generally across the projected path of the new seedbed is cut at least once before it is encountered by the chopping blades. The cutting disc penetrates the soil to a depth greater than the chopping blades and the intended depth of the crop seed. The chopping blades penetrate the soil to a depth greater than the intended depth of the seed placement. The operating depth of the seedbed preparation mechanism is independent of the operating depth in the soil of the seed placement mechanism.

Additionally a rear module, as illustrated with tanks, seed blowers, and transfer pump for fertilizer is mounted on the existing design frame, axle, and steering system, but it is a separate, distinct module. The planting module and the harvesting module may be disconnected from the common front module power unit and switched for planting row crops or harvesting. The harvesting configuration may have an attachment to the header to seed non-row crops, such as, a cover crop like rye or canola. Such rear module can be the rear unit of an articulated vehicle, such as a harvester.

BRIEF DESCRIPTON OF THE DRAWINGS

For a fuller understanding of the nature and advantages of the present method and process, reference should be had to the following detailed description taken in connection with the accompanying drawings, in which.

Figure 1:
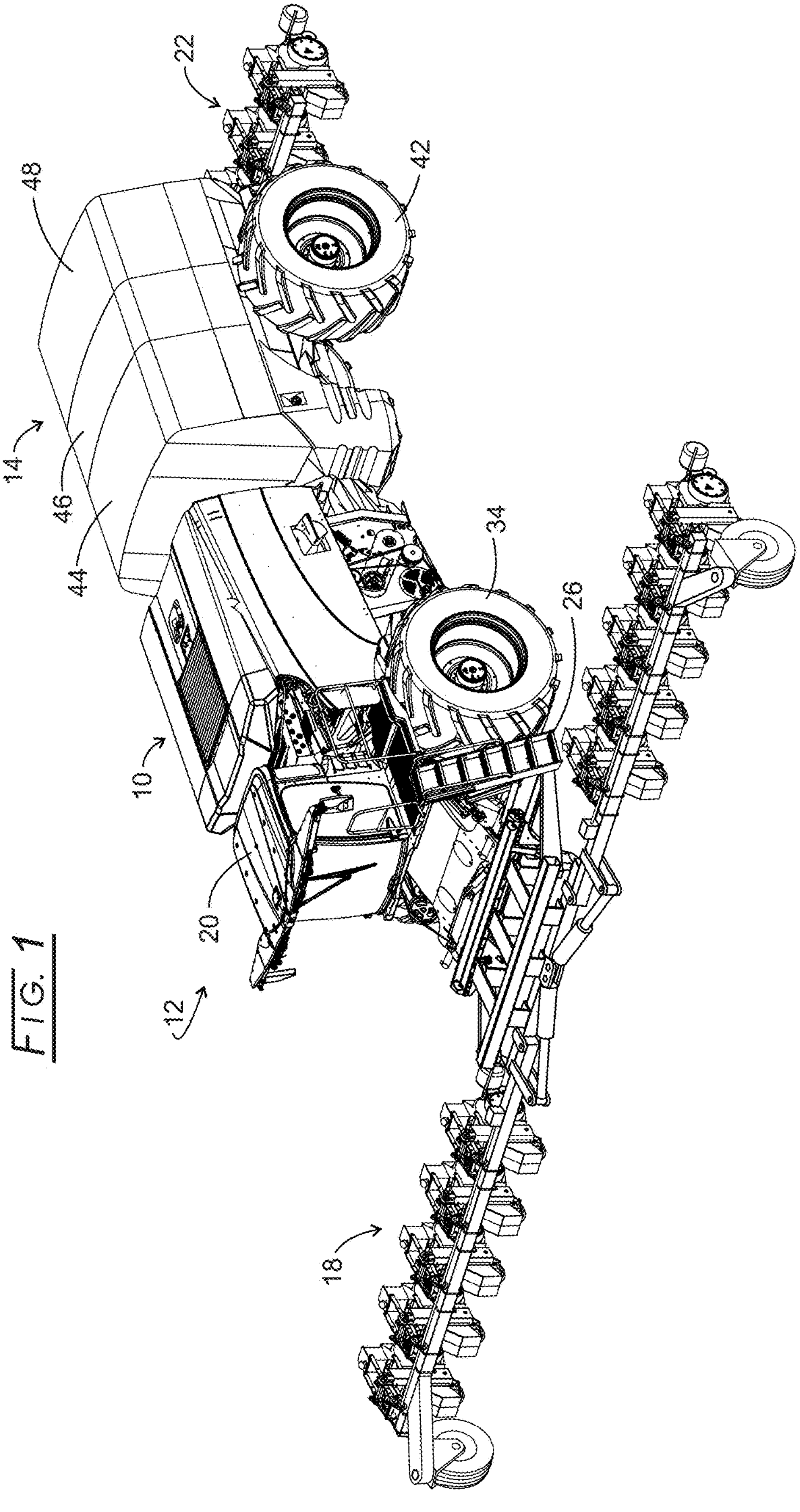
FIG. 1 is a perspective view of an exemplary articulated combine fitted with a rear module and till/plant/fertilize multi-functional row assemblies.

The drawings will be described in greater detail below.

DETAILED DESCRIPTION

The highly maneuverable articulated vehicle shown in U.S. Pat. No. 10,231,371, issued Mar. 19, 2019, (the disclosure of which is herein incorporated by reference in its entirety) includes a grainhead attached to a front end of its front module power unit for harvesting crops. The present disclosure contemplates adapting the articulated vehicle to carry a row unit having multiple operational functions in place of the grainhead. To achieve this, the present disclosure contemplates an articulated vehicle having a replaceable unit, i.e., either a grainhead or a multi-functional row assembly, attached to the front end of the front module power unit of the articulated vehicle. A first operational function of the multi-functional row assembly is that of a powered tiller row opener similar to that disclosed in U.S. Ser. No. 17/938,156 filed Oct. 5, 2022. A second operational function of the multi-functional row unit is to incorporate an assembly for planting and fertilizing row crops, such as, for example, corn, soybeans, and milo by attachment of a row opener. The present disclosure further contemplates a rear module attached to the front module power unit. Similar to the front module power unit, the rear module may include a grainhead, a compaction mitigation assembly as disclosed in U.S. Pat. No. 10,231,371, a multi-functional row assembly or other farming devices attached to its back end. A category 3, three-point hitch, may also be mounted on the back of the rear module allowing for lifting of the grain head, compaction mitigation assembly or multi-functional row assembly or other farming devices in a controlled manner off of the ground. The combination of the multi-functional row assembly and the rear module attached to the front power module (e.g., a combine, tractor or any other farming vehicle) is referred to as a multi-functional vehicular assembly for farming equipment.

The typical planting module and the harvesting module may be disconnected from the common front module power unit and switched with a module for either planting row crops (e.g., a multi-functional till/plant/fertilize row unit) or for harvesting. According to further aspects of the present teaching, the harvesting configuration may have an attachment to the header to seed non row crops, such as, a cover crop like rye or canola.

The rear module includes tanks, seed blowers, and a transfer pump for fertilizer (e.g., a fertilizer metering pump) mounted on the rear module design frame, axle, and steering system. However, the rear module is a separate, distinct module.

The multi-functional row unit efficiently performs multiple operations that are presently being done by several different implements being pulled across the field by a large tractor as follows:

1. Deep tillage after harvest to remove combine, grain cart, and tractor compaction tracks and ruts;
2. Applying fertilizer (for example, Nitrogen in the form of anhydrous ammonia or liquid 28% with a toolbar fertilizer applicator or a strip tiller in all upcoming corn planted fields or any other type of fertilizer and applicator or tiller); and,
3. Preparing the seedbed for planting with a field cultivator (tiller) except in those parts of the country where an existing No-Till planter with a ground powered row opener can do an acceptable job. This eliminates the capital cost of the big tractor and implements, plus labor and fuel to complete these operations. This has a huge impact on farmer profitability.

Accordingly, with application of the multi-functional row unit, the rear module combines in a single, integrated vehicle that is not towed, the following functions:

1. A seedbed preparation mechanism (which may include a 6-inch-wide powered tiller).
2. A row planter for discreet seeding.
3. Fertilizer placement in correct proximity to the seeds.

Furthermore, the rear module also functions as a means for carrying a truckload of fertilizer and seed in an integrated rear part of the vehicle that has powered wheels that work in concert with the front module wheels for both power and bidirectional steering and is not towed. In addition, the rear module incorporates means for transferring the seed and fertilizer from the storage tanks to the row placement units in the required amounts.

The rear module may further include an operator controlled 3-point hitch on its back side capable of lifting several thousand pounds in a controlled manner such as the multi-functional row unit disclosed herein, compaction mitigation accessories, a seeder, a planting module, a harvesting module or any other implement attached to the back of the rear module. The operator controlled 3-point hitch may also be attached to the front side of the front module power unit (e.g., a combine, tractor, etc.) for lifting and lowering the multi-functional row unit disclosed herein, compaction mitigation accessories, a seeder, a planting module, a harvesting module, or any other implement attached to the front of the front module power unit.

The front module power unit (e.g., tractor or combine) may be fitted with a conventional standard category 3 or 4 tractor quick hitch frame and joint assembly, with spacing of the two lower joints regulated by the hitch category. The upper, 3rd point of the hitch may or may not remain unused. According to certain aspects of the present teaching, the joint assemblies at the back side of the front module power unit may need to protrude less from the frame than in other embodiments. In other words, the hitch or joint assembly will essentially not protrude from the frame of the front module power unit or have minimal protrusion compared to standard category 3 or 4 tractor hitches. This feature prevents the turning moment on the combine rear axle from being reduced if the joint spacing were to be as far apart as possible. The spacing for a category 3 or 4 tractor quick hitches is determined by the ASAE standard for tractor three-point quick hitches.

The rear module may include 3 distinct units or tanks. The middle unit may be a starter unit. The rear unit may function as the main fertilizer tank. The front unit may contain the grain seed. According to certain aspects of the present teaching, the front unit does not extend vertically to the frame. Instead, a fan for seed spreading may be positioned below the front unit. Pipes, hoses, pumps, and the like may also be positioned below the front unit located there also. However, it is to be understood that these accessories (e.g., the fan, pipes, hoses, pumps, etc.) may be positioned below the middle or rear unit in addition to or independent from the front unit according to other aspects of the present teaching.

Figure 3:
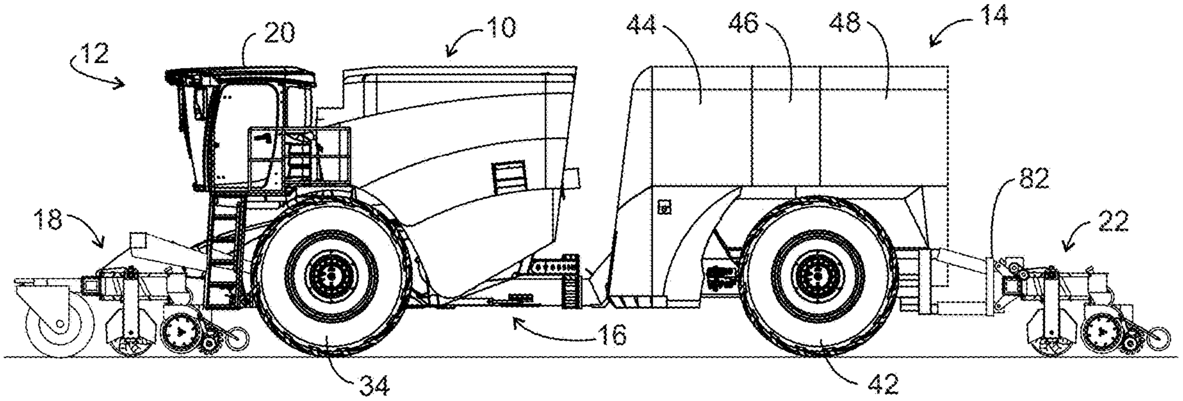
FIG. 3 is a side view of an articulated combine fitted with a rear module and till/plant/fertilize multi-functional row assemblies of FIG. 1.

Referring initially to FIGS. 1 and 3, an articulated combine, 10 consists of a powered processing unit (PPU, also known as crop processing unit, 12), a rear module 14, and an articulation joint, 16, that connects PPU 12 with rear module 14. The details of articulation joint 16 are disclosed in commonly owned application Ser. No. 14/946,827 filed Nov. 20, 2015. PPU 12 and rear module 14 each carry a till/plant/fertilize multi-functional row unit assembly (also referred to as "a till/plant/seed row unit", "a multi-functional row assembly" and "row unit assembly"), 18 22, an operator's cab, 20 and engines. According to certain aspects of the present teaching, the till/plant/seed row units 18, 20 may be mounted on front folding carrier bars which allows the till/plant/seed row units 18, 20 to fold forward for ease of transport. While both PPU 12 and rear module 14 are shown being respectively carried by wheel assemblies, 34 and 42, one or both may be tracked. A screened air inlet, 15, is located atop PPU 12 where the air likely is the cleanest around combine 10. The operator is granted access to an operator's cab 20 by a stair assembly 26, that extends upwardly from just above the ground and is more fully disclosed in commonly owned application Ser. No. 15/654,786, filed Jul. 20, 2017, now abandoned (U.S. Provisional 62/375,986). The rear module 14 has a front side and a rear side with the front side being attached to the combine 10 by articulation joint 16 and the rear side carrying a proximal till/plant/fertilize row unit assembly, 22 (proximal to the rear module 14). The rear module further includes at least two tanks for carrying seed and fertilizer. In the embodiment shown in FIG. 1, the rear module includes three tanks, a first tank 44, a second tank 46, and a third tank 48. The first tank 44 may be used for carrying seed and the second tank 46 and third tank 48 may be used for carrying fertilizer (e.g., a liquid fertilizer). However, it is to be understood that usage of the first tank 44, second tank 46, and third tank 48 for carrying seed or fertilizer may differ depending on the particular embodiment.

Figure 2:
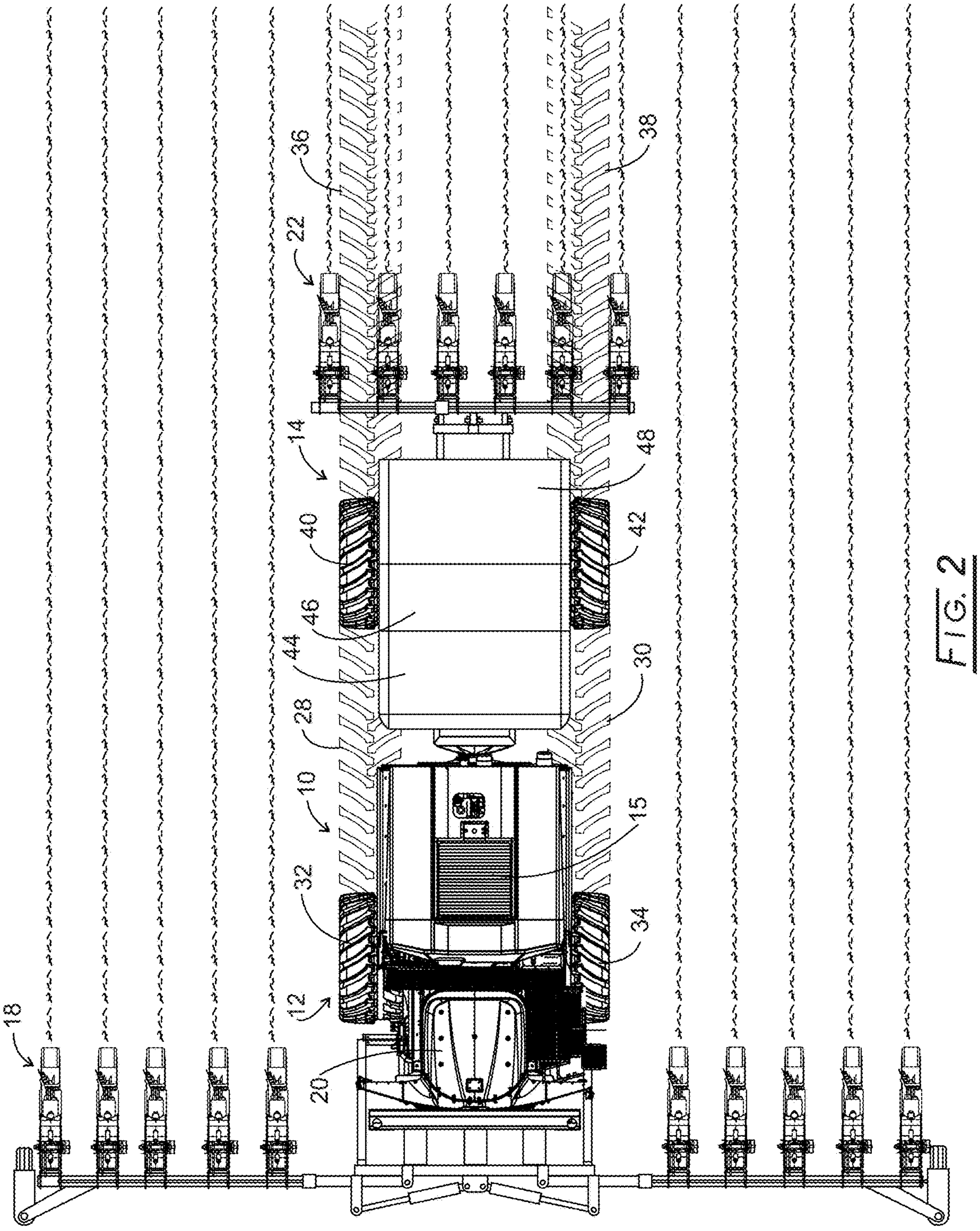
FIG. 2 is an overhead view of the articulated combine fitted with a rear module and till/plant/fertilize multi-functional row assemblies of FIG. 1 showing remediated tracks resultant from the till/plant/fertilize multi-functional row assembly.

In FIG. 2, tracks, 28 and 30, caused by wheels, 32 and 34 of the combine 10 and wheels, 40 and 42 of the rear module 14, respectively, of PPU 12 are shown. The rear wheels for rear module 14 reinforce tracks 28 and 30 by moving in these tracks when articulated combine 10 is driven in a straight line. Two sets of tracks may be created when articulated combine 10 turns in either direction. The disclosed proximal till/plant/fertilize multi-functional row unit assembly 22 carried by rear module 14 operates to till compacted soil from tracks 28 and 30, plant seed into the tilled soil and fertilize planted seed in a single step across the field resulting in remediated tracks 36 and 38. Remediated tracks, 36 and 38 are characterized by aerated or fluffy soil with weeds having been cut and seed, fertilizer and other organic matter (e.g., MOG or "material other than grain" and weeds) being mixed in with the soil. Operation of the combine as shown in FIG. 2 illustrates how combine 10 and rear module 14 used in conjunction with one another is capable of tilling soil, planting seed and fertilizing seed across a section of field in a single step as row unit assembly 18 attached to a front end of the combine 10 tills soil and plants and fertilizes seed in an area located on a first side and second side of the combine 10 while proximal row unit assembly 22 positioned on a back side of the rear module 14 tills soil and plants and fertilizes seed in an area located directly behind the combine 10 that is not covered by row unit assembly 18. This allows the tilling, planting and fertilization steps across a certain section of field to be completed in a single step (in one pass) without having to cover undeveloped areas of field in separate passes.

Figure 4:
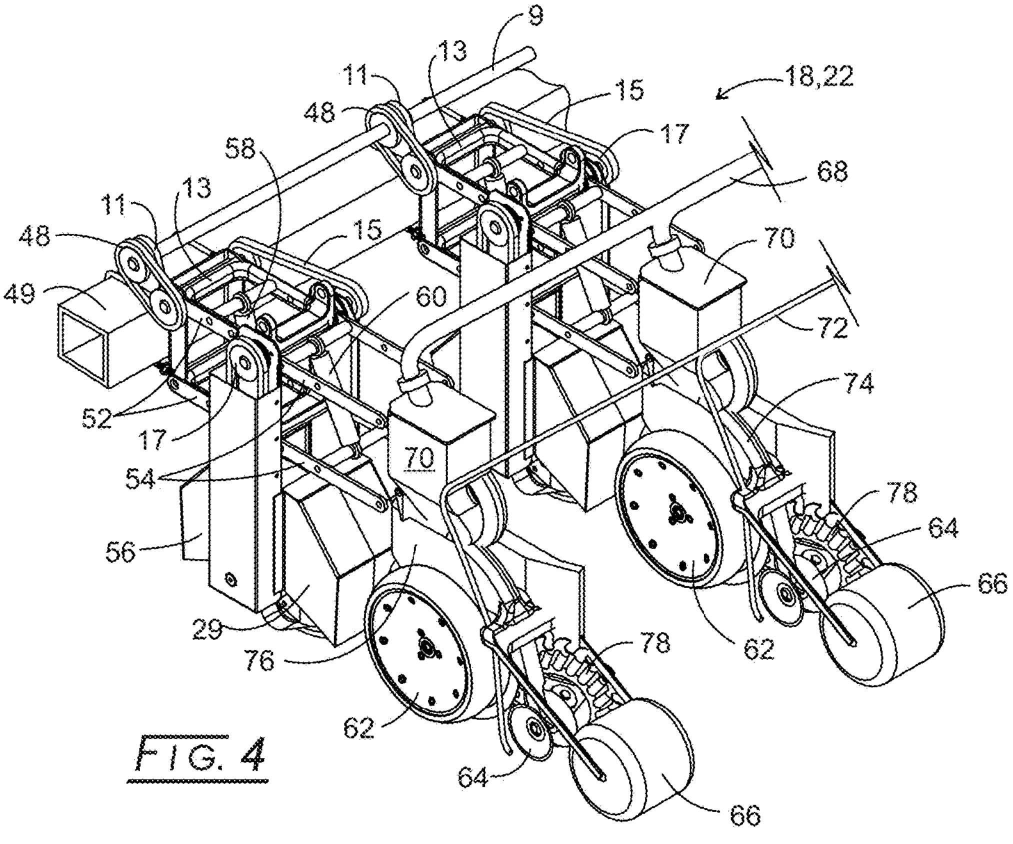
FIG. 4 is a perspective view of the till/plant/fertilize multi-functional row assemblies of FIG. 1.

FIG. 4 provides a detailed view of the till/plant/fertilize row units 18 and 22 that are positioned respectively at the front end of the combine 10 and the back end of the rear module 14. According to certain aspects of the present teaching, the till/plant fertilize row units are designed to accommodate 16 rows at 15 or 30 inches between each row when used in combination. However, the till/plant/fertilize row units may be designed to accommodate any number of rows and spacing between rows. Each row unit 18 and 22 includes a plurality of individual units for tilling soil, planting seed and fertilizing planted seed. Each individual unit of row unit assemblies 18 and 22 includes a turbine powered row cleaner 56 (also referred to as "a seedbed preparation device"). The turbine powered row cleaner 56 includes powered cutting blades and a ground powered disc in a cutting assembly as illustrated by cutting blades 12 and ground power disc 33 in the Figures of U.S. patent Ser. No. 17/938,156 (published on Apr. 6, 2023 as U.S. Pub. No. 2023/0104234) which is herein incorporated by reference in its entirety. Each cutting blade generally is a C-shape, although other shaped may find advantage in the seedbed preparation device or turbine powered row cleaner 56. The details of the cutting assemblies are provided in the Specification and Figures of U.S. Ser. No. 17/938,156 (published on April 6. 2023 as U.S. Pub. No. 2023/0104234). Although, according to certain aspects of the present disclosure, it may be recognized that the cutting assemblies contain congruous parts.

Each cutting assembly may be designed to be powered by a single power source or by its own power source. FIG. 4 illustrates a turbine powered row tiller/cleaner assembly 56 including a cutting assembly powered by a single power source. FIG. 4 shows a drive for powered cutting blades 48. The drive 48 includes first rotating bar 9 that rotates to drive a first chain assembly 11 including a pair of sprockets, which transfer motion to a first end of a second rotating bar 13. The second opposing end of the second rotating bar drives a second chain assembly, 15, including a pair of sprockets which transfers motion to a first end of a third rotating bar. The second end of the third rotating bar drives a third chain assembly 17, including a first sprocket and a second sprocket which causes rotation of an axle, which in turn causes rotation of the cutting blade and the ground powered disc located under hood 29. The rotational speed of the cutting blade and the components of the cutting assembly (e.g., drive 48, first rotating bar 9, first chain assembly 11 and associated sprockets, second rotating bar 13, second chain assembly 15 and associated sprockets, third rotating bar, third chain assembly 17 and associated sprockets, axle and cutting blade) is set by the operator and is independent of the vehicle groundspeed. According to certain aspects of the present teaching, the rotational speed of the cutting blade and components of the cutting assembly is higher than the ground speed of the vehicle and may be up to two times or more higher than the ground speed of the vehicle. Downforce adjusting cylinder assembly 58 provides downward force for cutting assemblies of the row tiller/cleaner 56. Downforce adjusting cylinder assembly 58 in turn is attached to pivot assemblies, which pivot assemblies are carried by a pivot point positioned at first chain assembly 11. Cutting assembly further includes a hood 29 to shield dirt and debris tossed up by the cutting assembly. Upon release of this downward force, the downforce adjusting cylinder assembly 58 retracts causing the row tiller/cleaner assembly 56 and more specifically, the cutting assembly to raise up off the ground. All other cutting assemblies may be powered in this manner.

The turbine powered row tiller/cleaner assembly 56 and its corresponding cutting assemblies are carried by a structural assembly 49, typically made of steel, which in turn is attached to a parallel link arm assembly 52. The parallel link arm assembly 52 is attached on its first end to the first chain assembly 11 and to the second chain assembly 15 on its first end, and to the second and third chain assemblies 15 and 17 on its second end. The parallel link arm assembly 52 includes pivots at its link connection points which allow the parallel link arm assembly to rotate in a downward direction upon application of force to downforce adjusting cylinder assembly 58 causing the turbine powered row tiller/cleaner assembly 56 to engage the ground by allowing the parallel link arm assembly 52 to rotate in a downward direction upon application of force to downforce adjusting cylinder assembly 58 causing the turbine powered row tiller/cleaner assembly 56 to engage the ground. Upon release of this downward force, the downforce adjusting cylinder assembly 58 causes the turbine powered row tiller/cleaner assembly 56 to raise up off the ground. The downforce adjusting cylinders 58 may flex vertically in unison or separately while still inputting rotary power to the assembly or individual units of the turbine powered row tiller/cleaner assembly 56.

Each unit of the till/plant/fertilize row units 18 and 22 further includes a planter assembly 76 attached to the turbine powered row tiller/cleaner 56. The planter assembly 76 is attached to the turbine powered row tiller/cleaner assembly 56 through planter parallel link arm assembly 54 which attaches the planter assembly 76 to the turbine powered row tiller/cleaner assembly 56. The planter parallel link arm assembly 54 includes pivots at its link connection points which allow the planter parallel link arm assembly 54 to rotate in a downward direction upon application of force to downforce adjusting cylinder assembly 60 causing the planter assembly 76 to engage the ground. Upon release of this downward force, the downforce adjusting cylinder assembly 60 retracts causes the planter assembly 76 to raise up off the ground. The downforce adjusting cylinders 60 may flex vertically in unison or separately while still inputting power to the assembly or individual units of the planter assembly 76.

The planter assembly 76 includes a seed hopper assembly 70. The seed hopper assembly 70 includes a first line 68 that is used to transport seed from the tank or tanks of the rear module 14 to the seed hopper assembly 70 and ultimately to the ground for planting through a separate line extending from the seed hopper assembly 70. A second line 72 extends from the rear module for delivering fertilizer immediately to the planted seed. Below the seed hopper assembly 70, the planter assembly includes a housing that houses a gauge wheel 62. Gauge wheel 62 is positioned adjacent opening wheel 78 and closing wheel 64 and functions as a means for controlling the depth of the soil tilled for planting. It also prevents soil from being displaced out of the furrow created by the opening wheel 78. In the embodiment illustrated in FIG. 4, the opening wheel 78 and closing wheel 64 are positioned adjacent to each other in front of the gauge wheel 62. However, other orientations of the opening wheel 78 and closing wheel 64 are contemplated. Positioned in front of the of the opening wheel 78 and closing wheel 64 is packing wheel 66 which packs the soil after the seed has been planted. As mentioned above, the planter assembly 76 also includes a second line (fertilizer line) 72 which extends from a corresponding fertilizer tank or tanks in the rear module 14 to the planter assembly 76 to deliver fertilizer to the planted seed.

Figure 5:
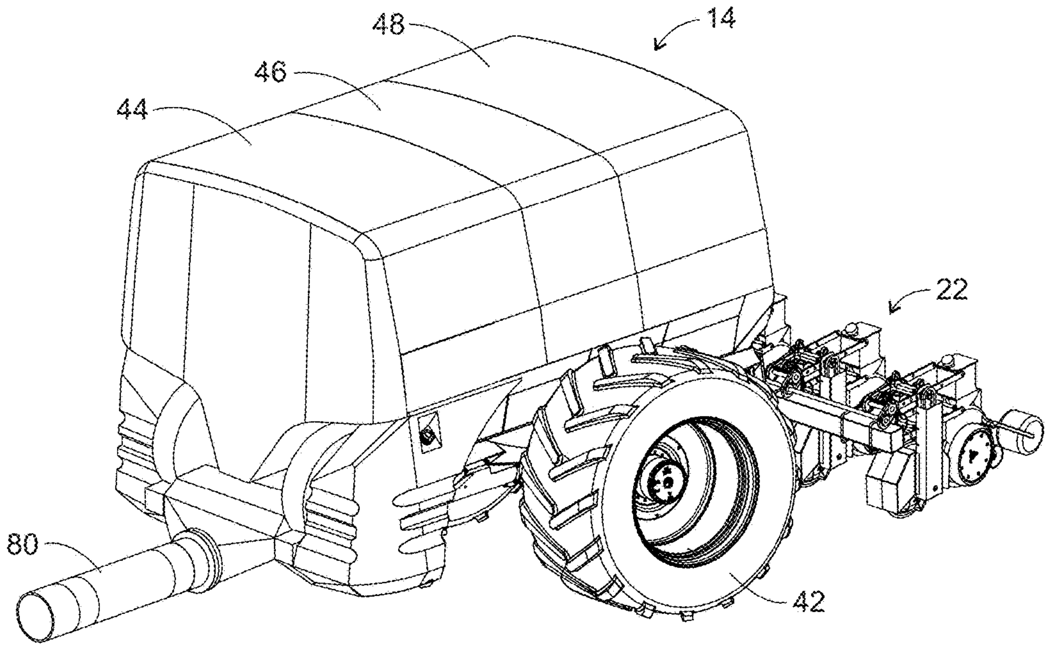
FIG. 5 is a perspective view of the rear module of FIG. 1.
Figure 6:
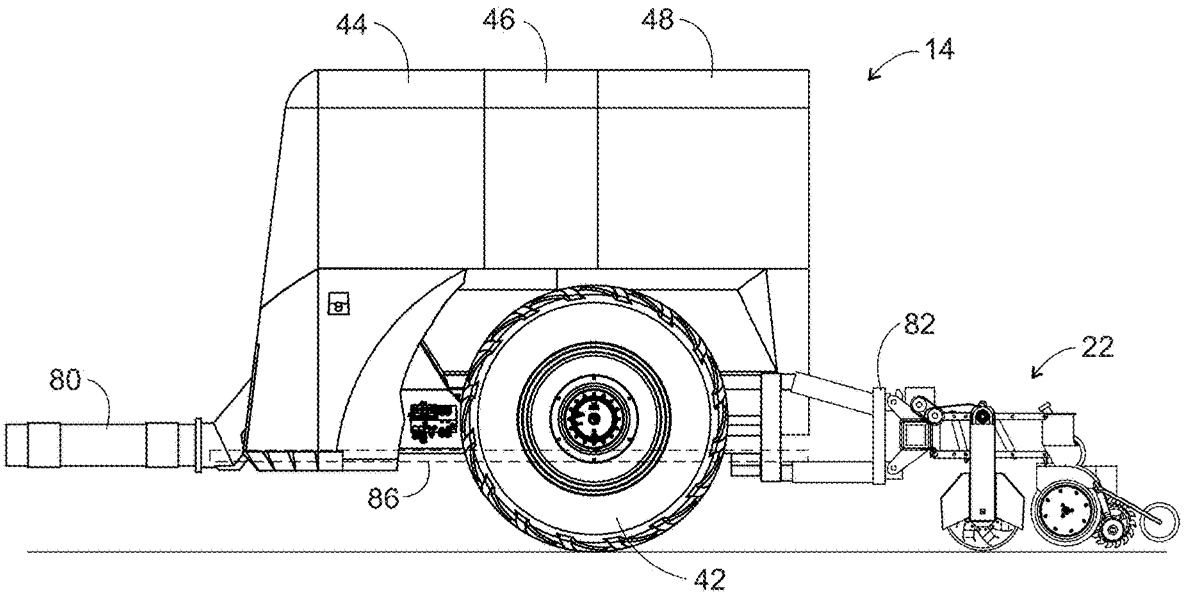
FIG. 6 is a side view of the rear module of FIG. 1.
Figure 7:
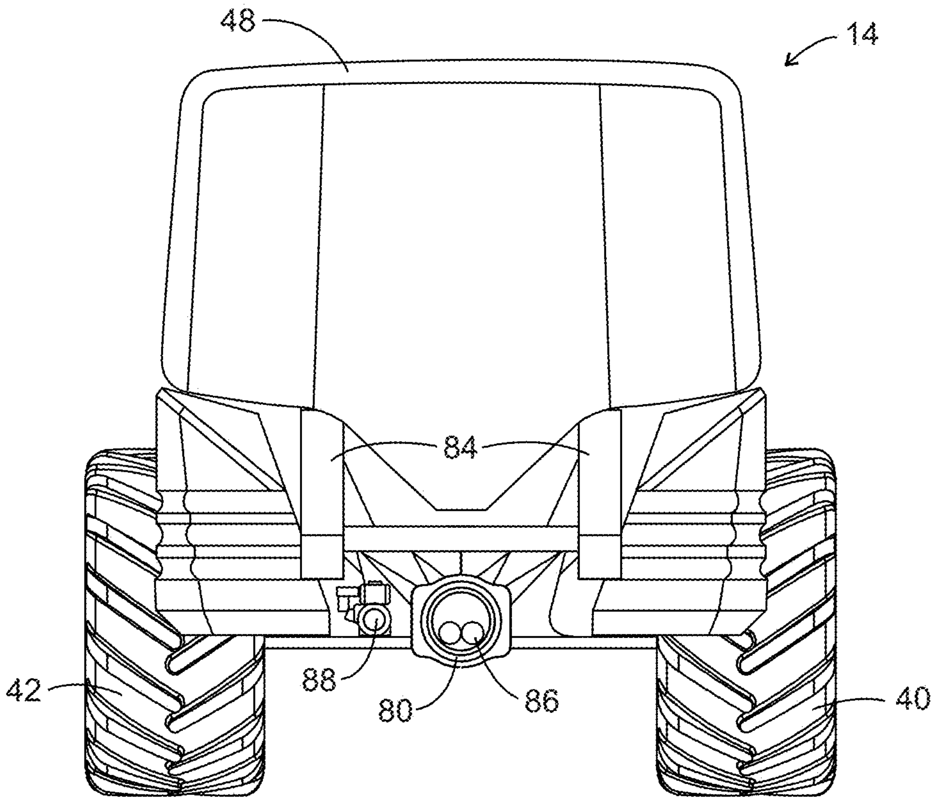
FIG. 7 is a front view of the rear module of FIG. 1.

Detailed views of the rear module are provided in FIGS. 5 to 7. As shown in FIGS. 5 and 6, the rear module 14 includes three tanks—a first tank 44 positioned towards a front end 14 of the rear module 14, a second tank 46 positioned in a middle section of the rear module 14 and a third tank 48 positioned at a back end of the rear module 14. According to certain aspects of the present teaching, the first tank 44 stores seed and the second and third tanks 46 and 48 store fertilizer (e.g., solid dry fertilizer and/or liquid fertilizer). However, it is to be understood that seed and fertilizer may be stored in any tank within the rear module 14 as deemed suitable for carrying out the delivery of seed and fertilizer to the till/plant/fertilize row assemblies 18, 22. According to certain aspects of the present teaching, the second tank 46 may constitute a starter unit for storing a starter material for fertilization and the third tank 48 may constitute the main fertilizer tank. The first tank 44 may store grain seed. According to certain aspects of the present teaching, the first tank 44 does not extend vertically to the frame of the rear module 14. A fan may be located below the first tank for seed spreading. Pipes, hoses, pumps and the like are located below the tanks of the rear module 14 for delivering seed and fertilizer to row assemblies 18 and 22. For example, seed blowers 84 transfer seed from the appropriate tank in the rear module through line 68 to seed hoppers 70 in the till/plant/fertilize multifunctional row assemblies 18 and 22. Likewise, lines 86 extending on a bottom side of the rear module 14 and through conduit 80 may be utilized for filling and/or discharging material (such as fertilizer and seed) in and from tanks within the rear module 14. Also, the rear module 14 may include a pump 88 for transferring fertilizer from the appropriate tank in the rear module 14 to the second line 72 for immediate delivery of fertilizer to the planted seed.

As mentioned above, delivery of the seed and fertilizer to the till/plant/fertilize multi-functional row assemblies 18 and 22 is accomplished through seed and fertilizer lines which extend from the respective tank in the rear module 14 to the multi-functional row assemblies 18 and 22. FIG. 7 illustrates an example of a pump 88 which is connected to such lines to assist with delivering seed/fertilizer to multi-functional row assemblies 18, 22. Also shown in FIGS. 5 and 6 is a conduit 80 attached to a front side of the rear module 14. In addition to including lines 86 for filling and/or discharging seed/fertilizer to and from the tanks, the conduit may also include drive and steering transfer assembly. In such embodiments, the drive and steering transfer assembly is positioned within the conduit 80 which may be in the form of mechanical linkages that are connected and fitted with a corresponding mechanical linkages that extend from the back side of the combine 10. The drive and steering transfer assembly 80 allows the wheels 40 and 42 of the rear module 14 to be powered by the combine engine so that rear module 14 wheels 40 and 42 work in concert with combine wheels 32 and 34 for both drive power and for bidirectional steering. This allows the rear module 14 to work in concert with the combine 10 without being towed.

Rear module 14 also includes an operator controlled three-point hitch 82 (as shown for example in FIGS. 3 and 6) which is capable of lifting multi-functional row assembly 22 being several thousand pounds in a controlled manner off the ground. A similar hitch may be located at the front of combine 10 for lifting multi-functional row assembly 18 in a controlled manner off the ground.

With respect to the hitch between the combine 10 and the rear module 14, it is to be understood that the combine 10 may be fitted with a conventional standard category 3 or 4 tractor quick hitch, with spacing of the two lower joints regulated by the hitch category. According to certain aspects of the present teaching, the upper, 3$^{rd}$ point of the hitch may remain unused. Compared to the other combine embodiments, the hitch joint assembly may need to protrude less from the frame of the combine 10. This allows for achieving a proper turning moment between the combine 10 and the rear module 14 as the turning moment between the combine 10 and the rear module 14 may be reduced too much if the joint spacing in the hitch between the combine 10 and the rear module 14 is as far apart as possible. The spacing for a category 3 or 4 tractor quick hitch for the combine is determined by the ASAE standard for tractor three-point quick hitches.

Figure 8:
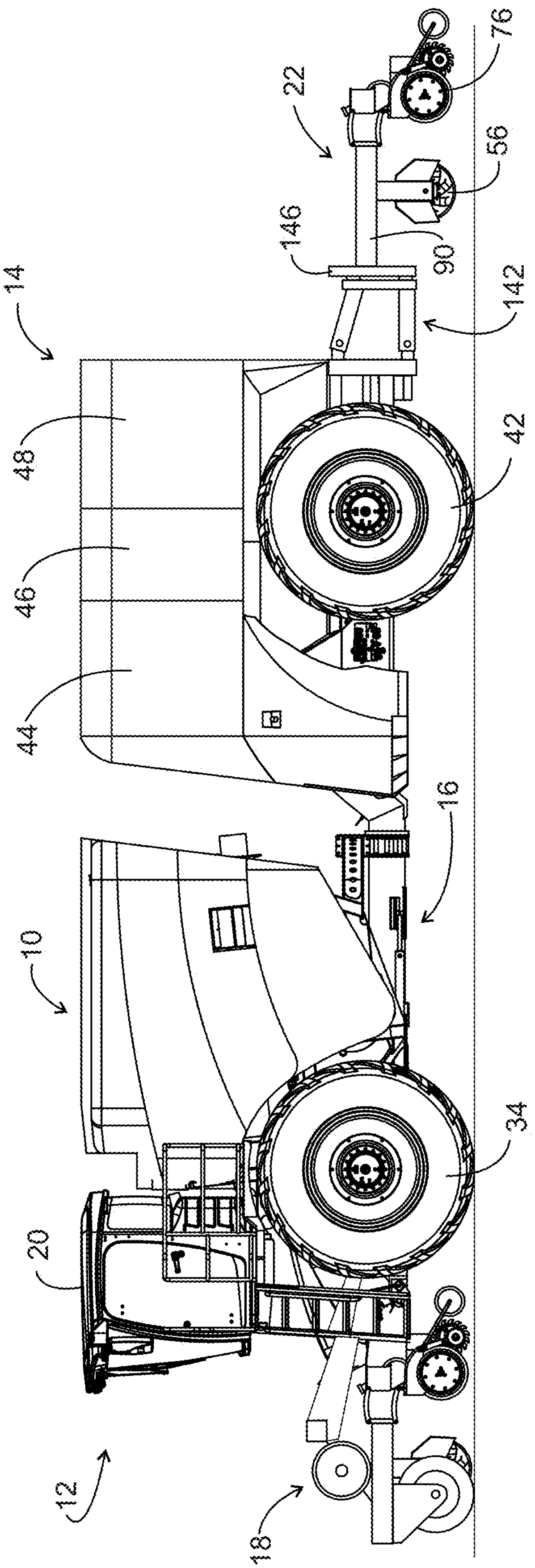
FIG. 8 is a side view of an exemplary articulated combine with a rear module and till/plant/fertilize multi-functional row assemblies.
Figure 9:
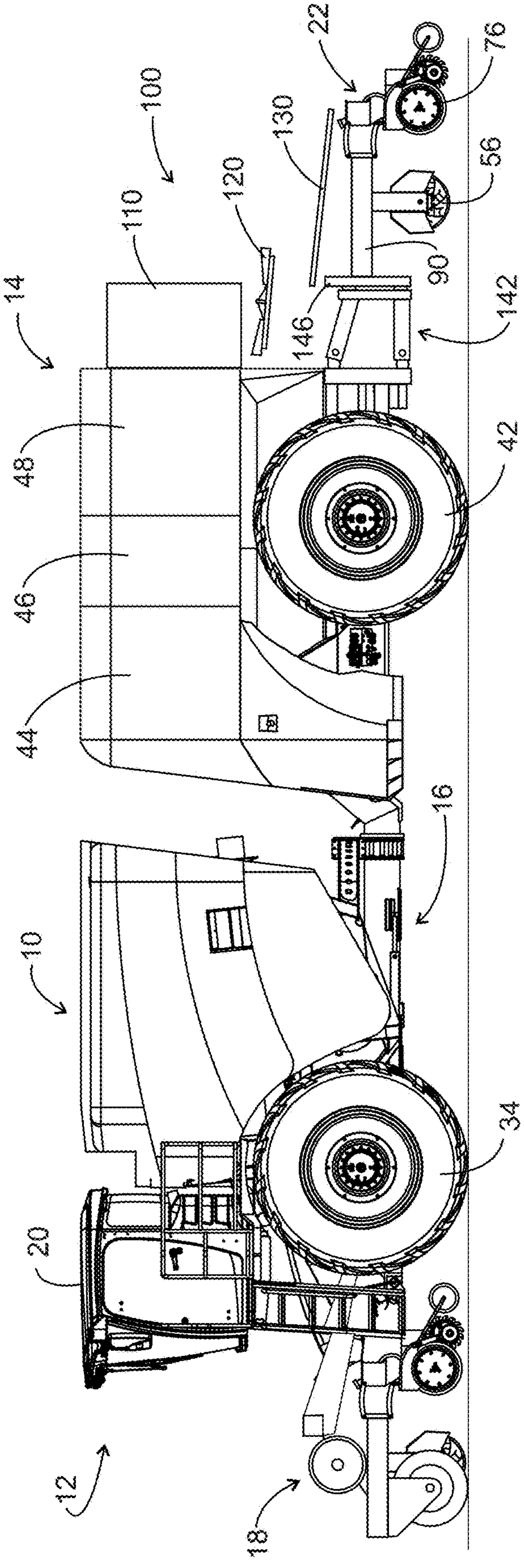
FIG. 9 is a side view of an exemplary articulated combine with a rear module, multi-functional row assemblies and a dry material spreader or pan assembly.
Figure 10:
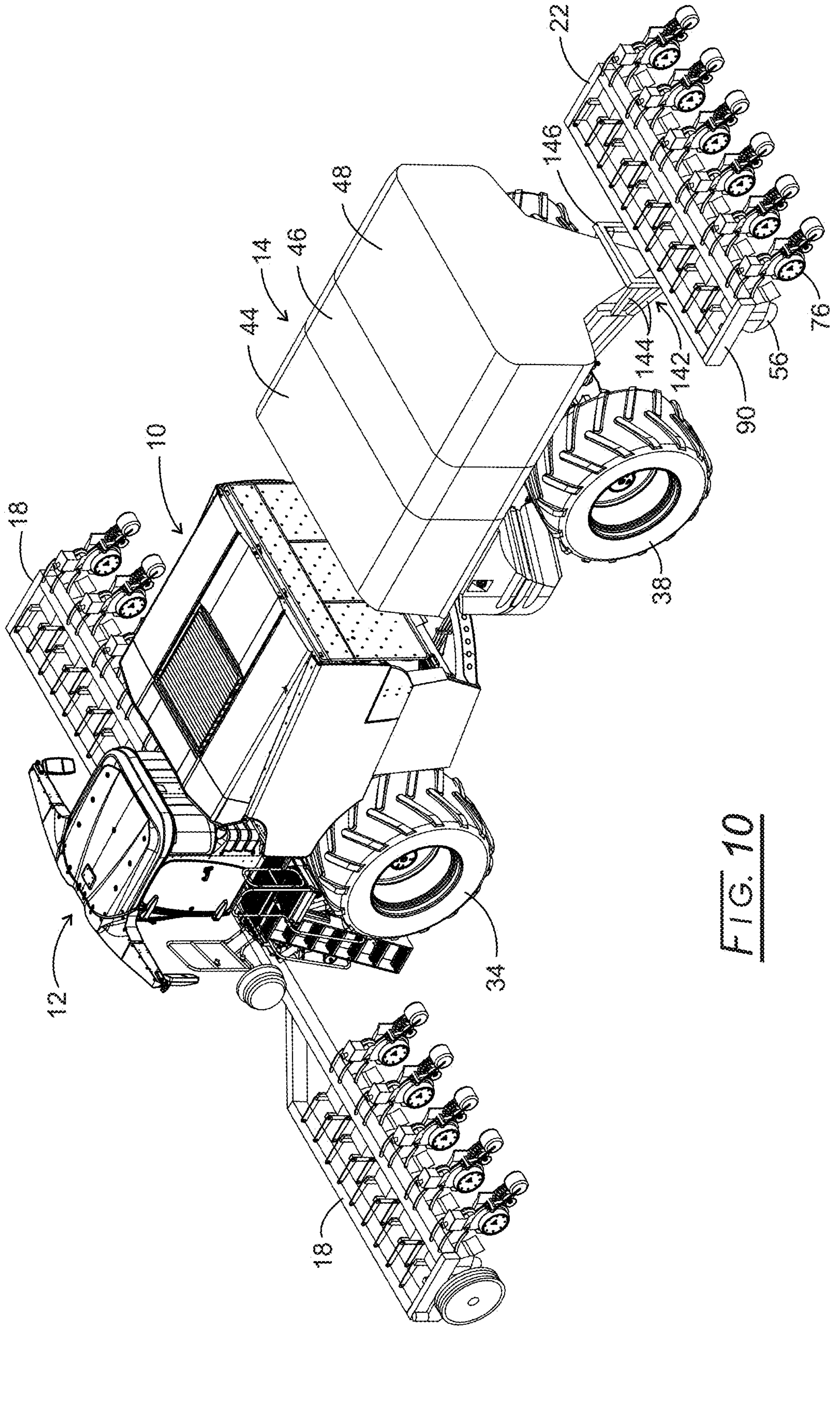
FIG. 10 is a rear perspective view of the exemplary articulated combine of with the rear module and the multi-functional row assemblies of FIG. 8.
Figure 11:
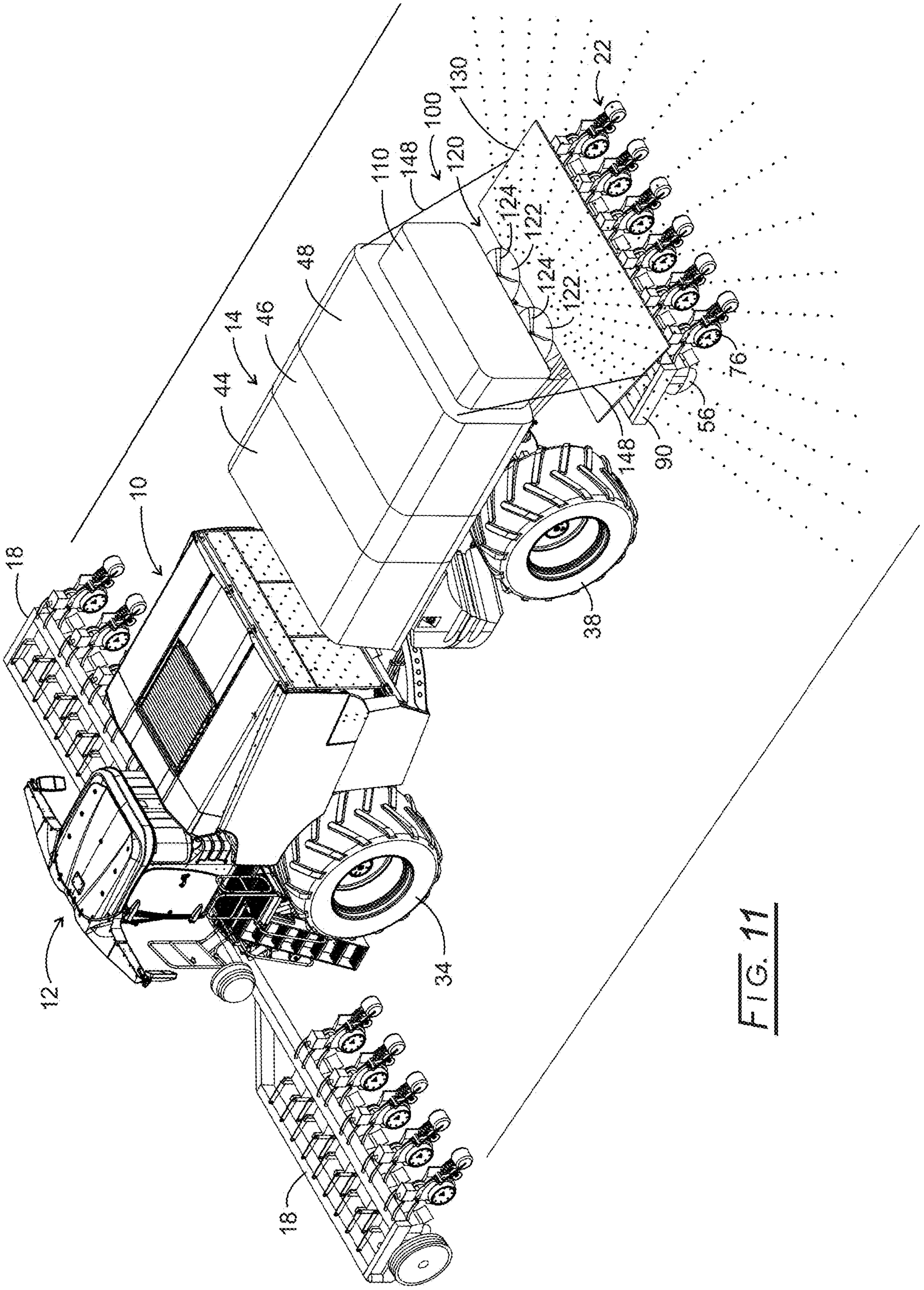
FIG. 11 is a rear perspective view of the exemplary articulated combine with the rear module, the multi-functional row assembly and the dry material spreader or pan assembly of FIG. 9.
Figure 14:
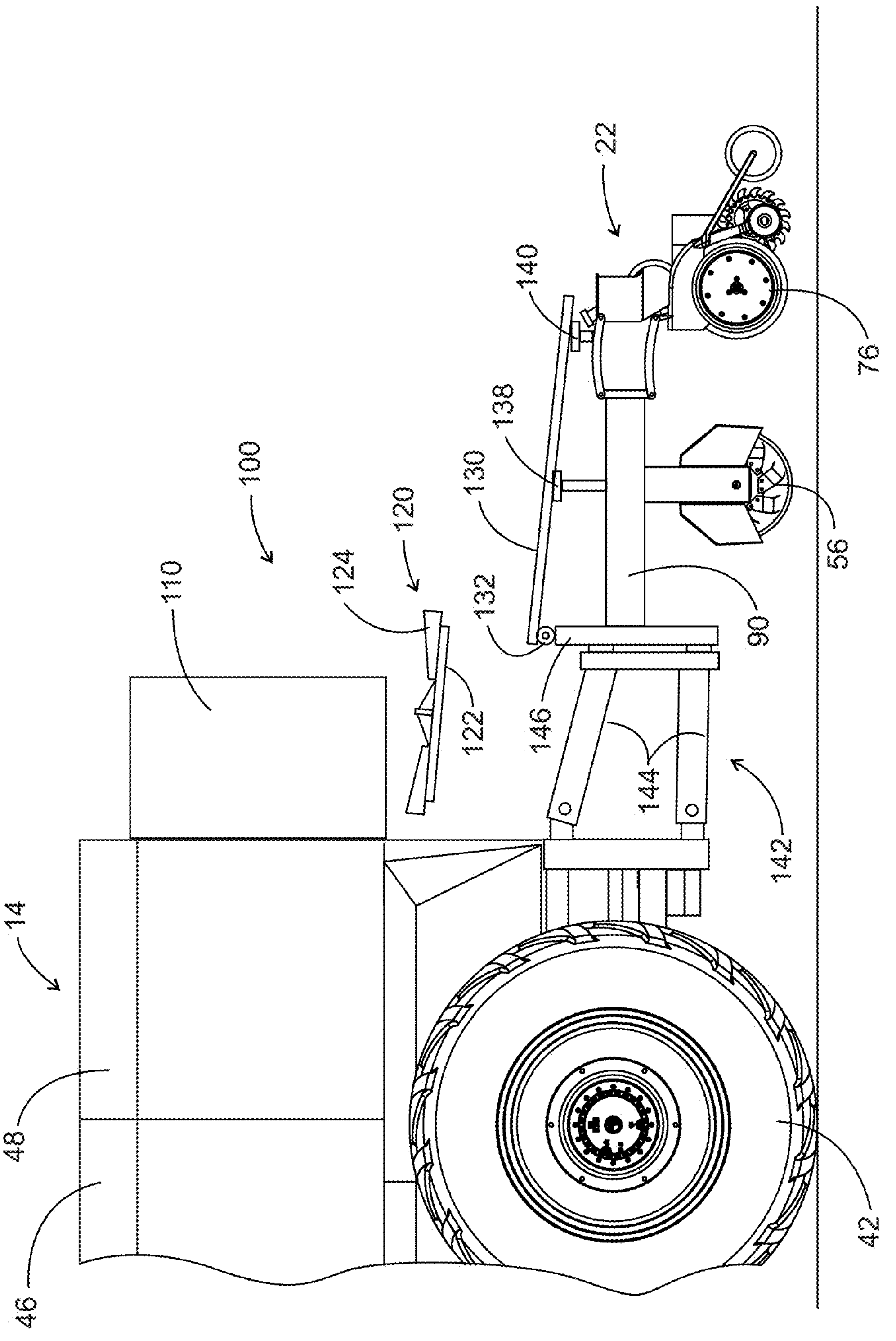
FIG. 14 is a rear side view of the exemplary dry material spreader or pan assembly of FIG. 12 with the multi-functional row assembly of the rear module in a partially raised position.
Figure 15:
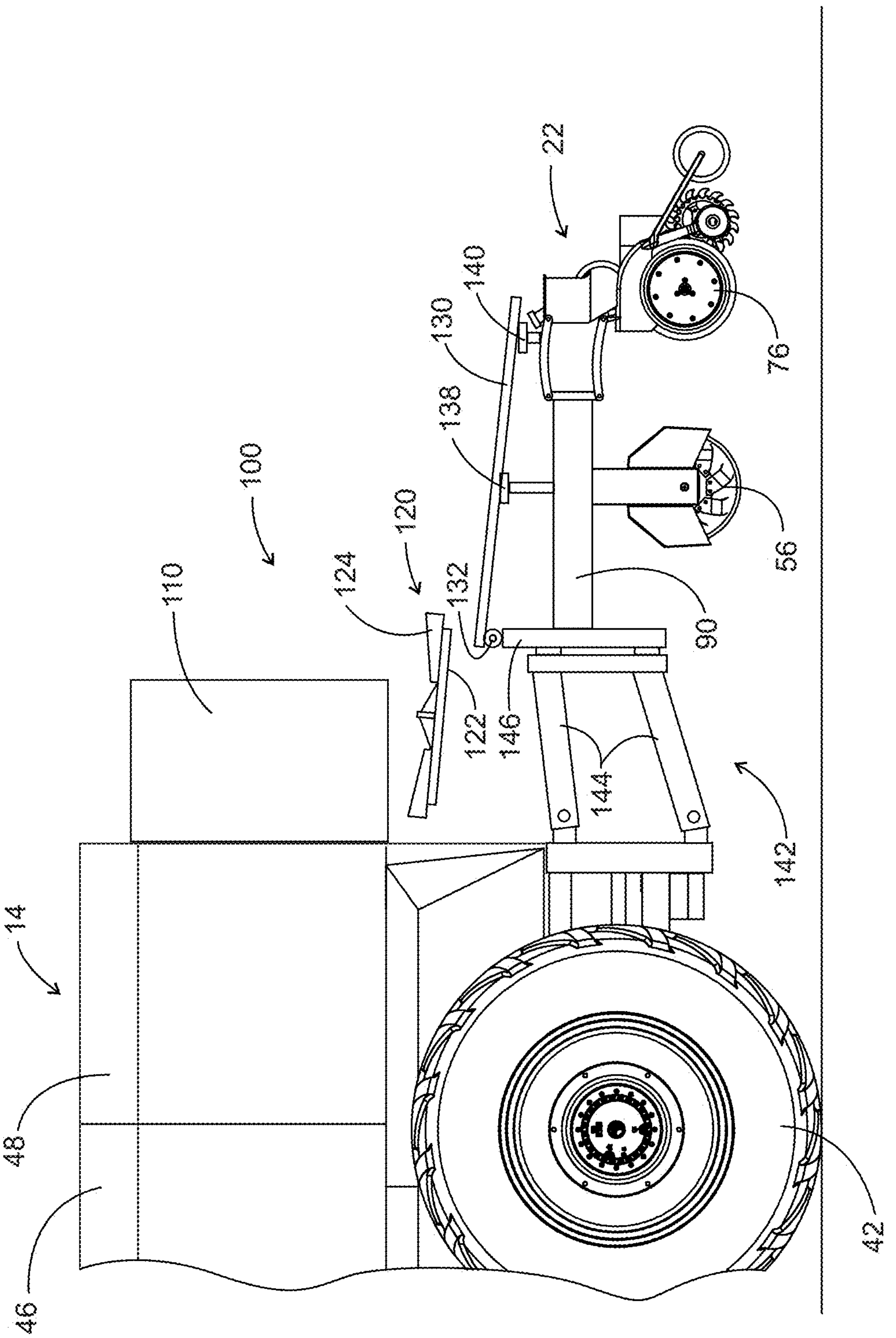
FIG. 15 is a rear side view of the exemplary dry material spreader or pan assembly of FIG. 12 with the multi-functional row assembly of the rear module in a fully raised position.
Figure 16:
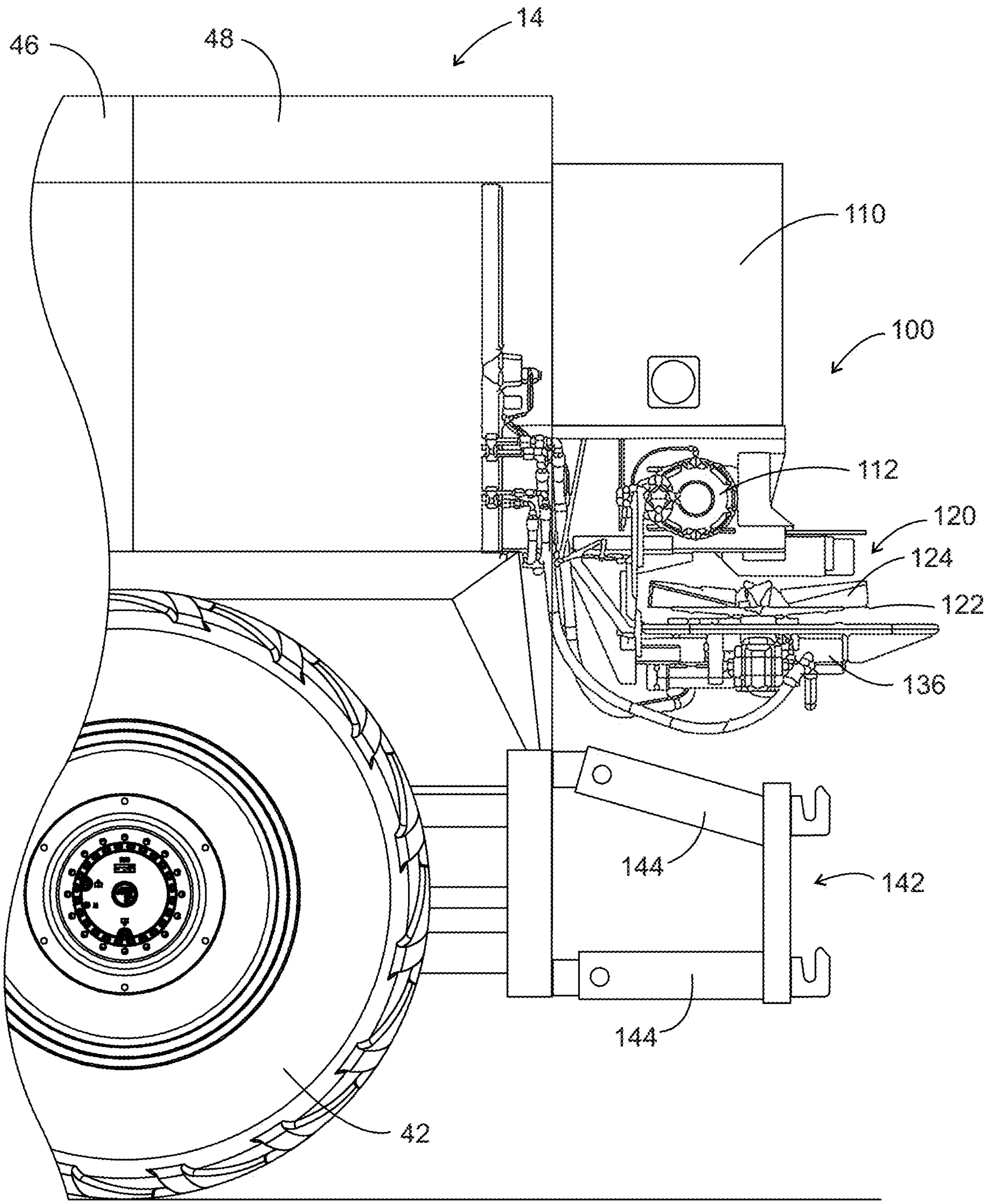
FIG. 16 is an exemplary rear module having a hopper and gate and spreader attached to the back or trailing end of the rear module.
Figure 17:
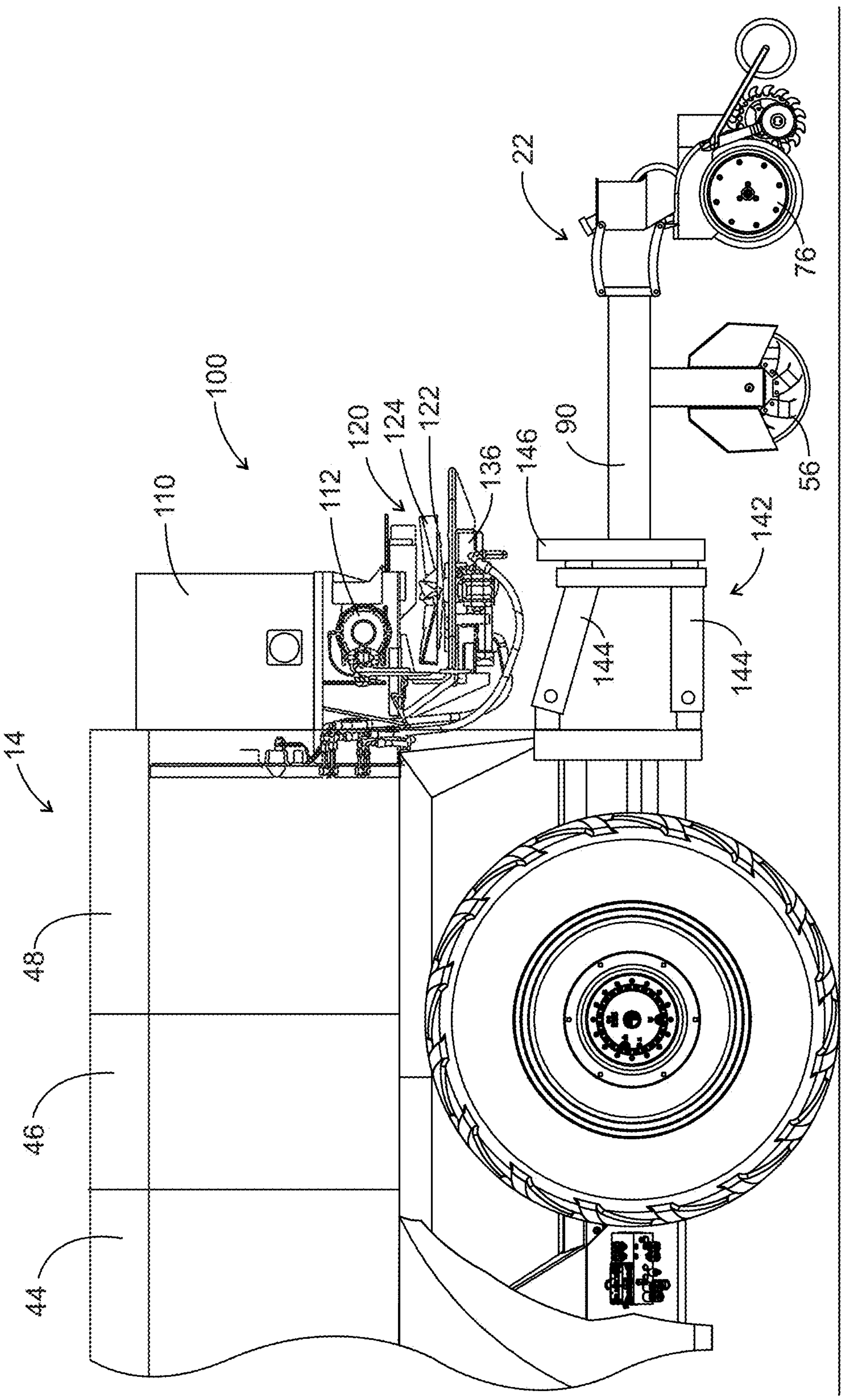
FIG. 17 is an exemplary rear module showing how a hopper and gate and spreader is positioned over a multi-functional row assembly without a pan assembly.

Further embodiments of an exemplary articulated combine with a rear module and till/plant fertilize multi-functional row assemblies are illustrated in FIGS. 8 to 17. FIGS. 8 and 10 show an exemplary powered processing unit (PPU, also known as a crop processing unit) 12 including a row assembly 18 and a combine 10 connected to a rear module (also known as a spreader box) 14. FIGS. 8 and 10 illustrate a basic articulated combine. FIGS. 9 and 11 illustrate an articulated combine wherein the rear module or spreader box 14 includes or is fitted with a dry material spreader assembly (also known as a pan assembly) 100. The dry material spreader or pan assembly 100 shown in FIGS. 9 and 11 is connected to a back end or trailing end of the rear module or spreader box 14 and is positioned above row assembly 22. The dry material spreader assembly 100 includes three components—a hopper and gate 110 to distribute dry material, a spreader 120 to distribute dry material, and a pan 130 to keep the dry material off of the row assembly 22. FIGS. 11, 16 and 17 illustrate examples showing the hopper and gate 110 and spreader 120 connected to the back or trailing end of the rear module or spreader box 14. The hopper and gate 110 is designed to receive dry material, such as dry fertilizer from storage within the rear module or spreader box 14. In certain embodiments, the hopper and gate 110 includes a hopper and at least one gate that is openable and closable to control the distribution of dry material onto the spreader 120. Once the gate is opened, dry material falls from the hopper onto the spreader 120. As shown in FIG. 16, the hopper and gate 110 may include a meter 112 to control the rate of flow of dry material from the hopper. It is noted that in other embodiments, the hopper and gate 110 may include at least two gates—a first gate that allows dry material to enter the hopper from the rear module or spreader box 14 and a second gate that allows dry material to be distributed to the spreader 120 from the hopper.

As shown in FIG. 11, the spreader may be a circular plate 122 that spins in a rotational manner along an axis and includes any number of plate dividers or vanes 124 for distributing dry material onto the pan 130. It is noted that the spreader 120 is designed to distribute dry material over the entire area of the pan (i.e., the full length and width of the pan 130). The pan 130 is designed to cover the entire length of the top portion of row assembly 22. It is to be understood that in certain embodiments, the spreader 120 includes two rotationally spinnable circular plates 122 as shown in FIG. 11. However, the spreader 120 may include any number of rotationally spinnable plates 122 of any shape as deemed suitable to distribute dry material along the entire area of the pan 130. FIGS. 16 and 17 illustrate further examples of spreader 120.

As shown in FIGS. 11 to 15, the pan is positioned below the spreader 120 over a rectangular frame 90 of the row assembly 22 that houses the turbine powered row cleaner or seedbed preparation device 56 and that attaches at its back end or trailing end (i.e., the end proximate to the trailing end of the articulated combine) to planter assembly 76. According to certain aspects of the present teaching, pan 130 is positioned six inches or about six inches below the spreader 120, however, the pan 130 may be positioned at any distance below the spreader 120 as deemed suitable. As mentioned above, pan 130 covers the entire length of the row assembly 22. This allows the pan to function as a protective device or deflector shield preventing material from being kicked up from the row assembly 22 during the till, plant and fertilize process. It also prevents dry material (e.g., dry fertilizer) from the hopper and gate 110 from entering the area of the row assembly (e.g., the turbine power row cleaner 56 and in some cases, the planter assembly 76) during the tilling and planting process. Traditional spreader systems allow dry material (e.g., fertilizer) to be distributed immediately below the spreader. If no pan were present, such material would be allowed to enter the row assembly directly from the hopper and gate 110 and spreader 120 (as shown in FIG. 17). This would cause the component parts and moving parts of the row assembly to very quickly corrode out.

According to certain aspects of the present teaching, the width of the pan 130 extends so that its back end or trailing end (i.e., the end proximate to the trailing end of the articulated combine or row assembly 22) covers the turbine powered row cleaner 56 (including cutting blades and ground power disc) of the row assembly 22. This allows the dry material to be distributed to the ground behind the turbine powered row cleaner 56 (with respect to the front end of the articulated combine) or after the soil has been tilled by the turbine powered row cleaner 56, i.e., simultaneously with the planting of seed. However, in other embodiments, the width of the pan 130 may extend further to cover at least a portion of the planter assembly 76 allowing for distribution of dry material after seed has been planted. In other embodiments the pan may be any width allowing for the adjustment of timing for the distribution of dry material at any point during the till/plant/fertilize cycle. The pan may be made of any material deemed suitable by a person of ordinary skill in the art. According to certain aspects of the present teaching, the pan is made from stainless steel.

According to certain aspects of the present teaching, the pan 130 may be angled as shown in FIG. 9 and FIGS. 12 to 15 so that its front end (i.e., the end proximate to the leading end of the articulated combine) is tilted in an upward direction and its back end or trailing end (i.e., the end proximate to the trailing end of the articulated combine) is tilted in a downward direction to allow for dry material to fall off the pan to be distributed onto the ground after tilling the soil. FIGS. 12 to 15 illustrate how the pan 130 is connected to the row assembly 22. In certain embodiments, the pan 130 includes a front hinge 132 mounted to a front end of a frame 90 (i.e., the end proximate to the leading end of the articulated combine) that forms the row assembly 22 as shown in FIG. 10. In other embodiments, the pan 130 includes a front hinge 132 mounted to the back of a frame 136 that supports a spreader box unit (including the hopper and gate 110 and spreader 120) attached to the back of the rear module or spreader box 14 as shown in FIG. 16. The front hinge 132 allows the pan 130 to achieve a slope so that it is angled downwards towards the back end or trailing end of the row assembly 22 (i.e., the end towards the trailing end of the articulated combine or row assembly 22). According to certain aspects of the present teaching, the angle of slope may be between 6 to 10 degrees. In certain cases, the angle of slope may be 8 degrees or about 8 degrees. However, the angle of slope may be adjusted to any degree of slope as necessary.

The pan 130 rests on or is positioned over at least one push bar or link. As shown in FIGS. 12 to 15, the pan 130 rests on or is positioned over a front push bar or link 138 and a rear push bar or link 140. In certain embodiments, the front push bar or link 138 extends across the length of the frame 90 that supports the row assembly 22 (particularly over the turbine powered row cleaner 56 portion of the row assembly 22) and the rear push bar or link 140 extends over the length of the planter assembly 76. In further embodiments, the front push bar or link 138 and the rear push bar or link 140 extend across the length of the frame 90 that supports the row assembly 22. In other embodiments, it is also contemplated that the front push bar or link 138 and the rear push bar or link 140 may be positioned at the ends of the frame 90 (e.g., first and second ends of the frame) or at certain points along the length of the frame 90. The front push bar or link 138 and the rear push bar or link 140 provide structural support to the pan 130 as it rests over the frame 90 or the frame 90 and the planter assembly 76 of the row assembly 22.

Figure 12:
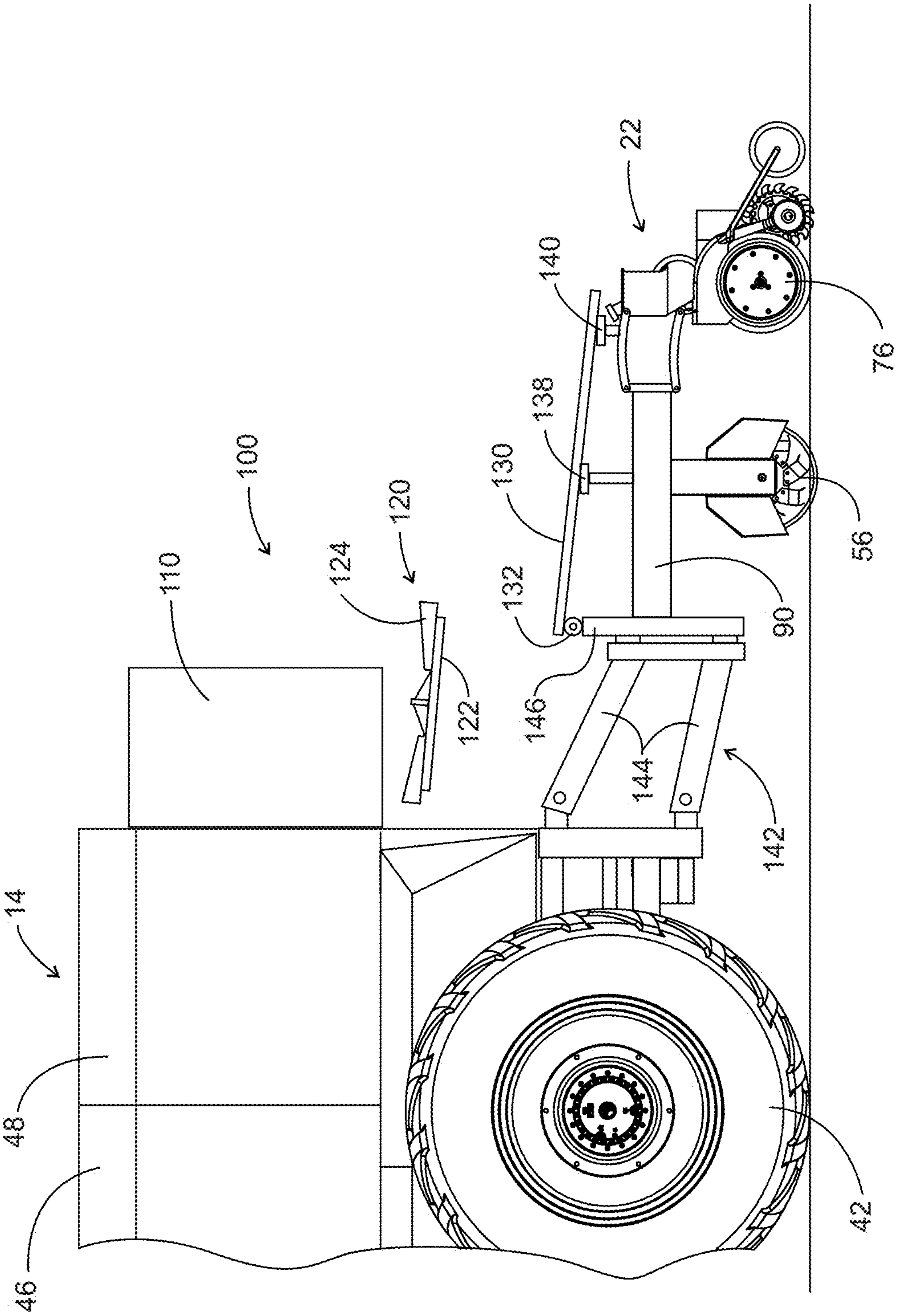
FIG. 12 is a rear side view of an exemplary dry material spreader or pan assembly attached over a multi-functional row assembly of a rear module.

FIGS. 12 to 15 further show movement of the pan 130 as the articulated combine or row assembly 22 travels over the ground and as the row assembly 22 is lifted to a raised position. FIG. 12 shows the normal position of the pan 130 as the row assembly is in its in-use position traveling over the ground. As shown in FIG. 12, the pan 130 is connected to front hinge 132 and rests on or is positioned over a front push bar or link 138 and a rear push bar or link 140. It is noted that front push bar or link 138 is positioned over turbine powered row cleaner 56 and the rear push bar or link 140 is positioned over the planter assembly 76. As mentioned previously, the turbine powered row cleaner 56 and the planter assembly 76 of the row assembly 22 are attached via parallel links. This allows for upward and downward movement of the turbine powered row cleaner 56 and the planter assembly 76 while the row assembly 22 is in operation and the articulated combine is traveling across the field. If the turbine powered row cleaner 56 or the planter assembly 76 raises or lifts up during operation, it will cause the pan 130 to move upward. The pan 130 will then subsequently come back down to rest on the front push bar or link 138 and the rear push bar or link 140.

Figure 13:
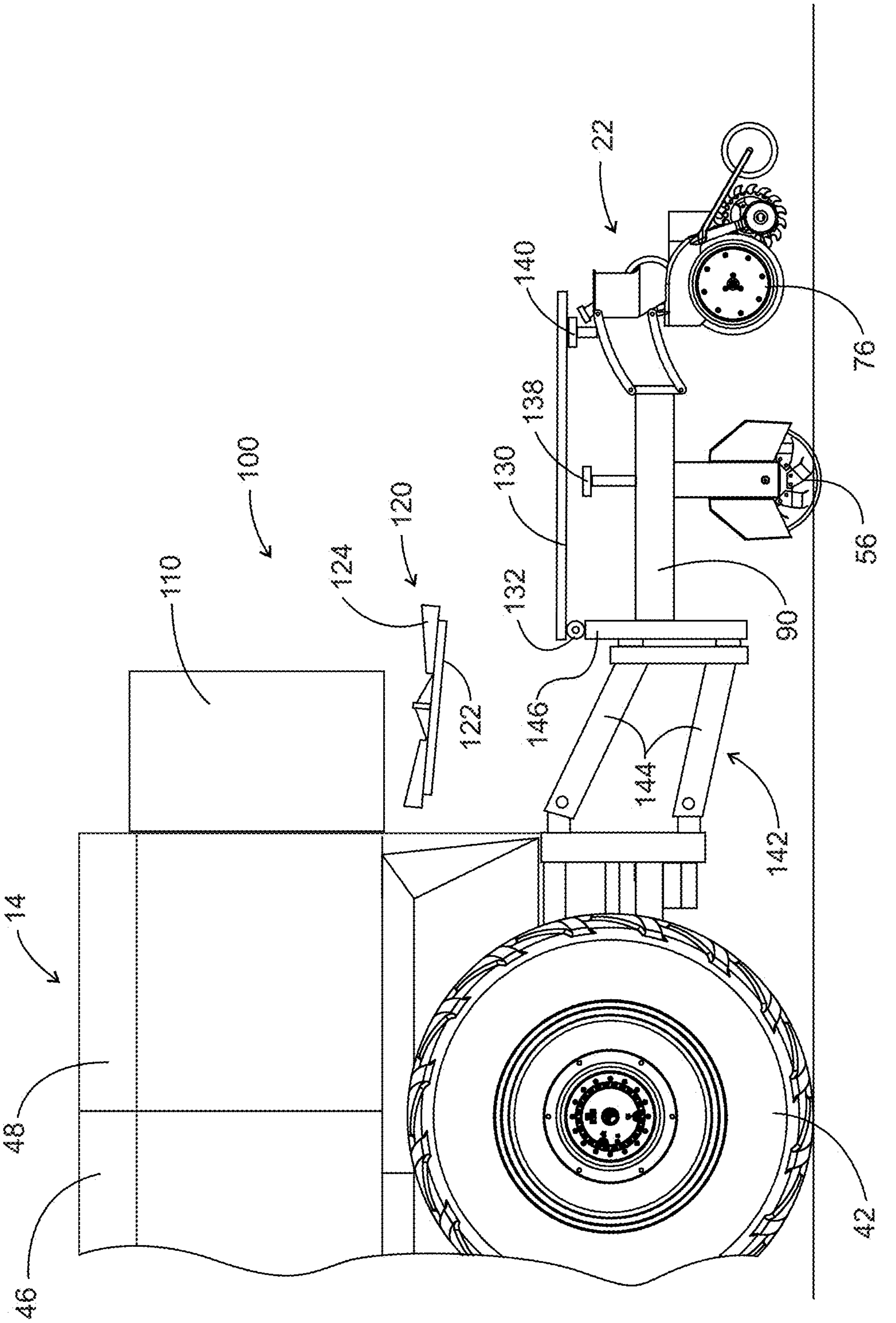
FIG. 13 is a rear side view of the exemplary dry material spreader or pan assembly of FIG. 12 with the planter assembly of the multi-functional row assembly of the rear module in a raised position.

FIG. 13 shows the position of the pan 130 as the planter assembly 76 is raised up or lifted up from the ground (e.g., due to an obstacle) while the turbine powered row cleaner 56 remains at ground level. As shown, in FIG. 13, in this scenario, the pan 130 is pushed up with the upward movement of the planter assembly 76 and returns back down to its normal position, i.e., when the planter assembly 76 returns to its operational position on the ground as shown in FIG. 12. It is noted that in the raised position shown in FIG. 13, the middle portion of the pan 130 lifts up off of the front push bar or link 138 and returns back to its resting position on the front push bar or link 138 as the planter assembly 76 returns to is normal operational position on the ground as shown in FIG. 12.

FIG. 14 shows the position of the pan when the row assembly 22 is in a partially raised position and FIG. 15 shows the position of the pan 130 when the row assembly 22 is in a fully raised position. The raising and lowering of the row assembly 22 is accomplished by a linkage and frame assembly 142 (in some embodiments, also referred to as a three-point hitch) including linkage bars 144 pivotally attached at its front end or leading end to the rear module or spreader box 14 and pivotally attached at its back end or trailing end to a header frame 146 attached to the row assembly 22. As shown in both FIGS. 14 and 15, the pan 130 remains in its normal resting position over the front push bar or link 138 and the rear push bar or link 140 as the row assembly 22 as a unit, is partially and fully raised off the ground.

It is contemplated that the pan 130 may optionally include a pair of chains or braces 148 that connect the side end portions of the pan 130 to the side ends at the back end or trailing end of the rear module 14 (e.g., a first and second side end towards the back end or trailing end of the rear module 14) or alternatively to the back end or trailing end of the rear module 14 (i.e., the end towards the trailing end of the rear module 14) or a component of the rear module 14 (e.g., the hopper and gate 110).

In further embodiments, the ends of the pan including the side ends of the pan and the rear or back end of the pan (i.e., the end proximate to the trailing end of the articulated combine) may include sloped edge portions angled downwards (not shown) to assist with the distribution of dry material from the pan to the ground. According to certain aspects of the present teaching, the sloped edge portions at the side ends and rear or back end of the pan may have a slope of eight degrees. However, any degree of slope may be utilized as deemed suitable by a person of ordinary skill in the art.

Provided below are various embodiments of a multi-functional vehicular assembly for farming equipment.

A first embodiment of a multi-functional vehicular assembly for farming equipment includes: a multi-functional row assembly comprising a plurality of individual row units mounted on a frame for tilling soil, planting seed and fertilizing planted seed, and a rear module attached to a front power module, wherein each row unit comprises a turbine powered row tiller/cleaner assembly and a planter assembly, wherein the multi-functional row assembly is attached to the rear module and is capable of being attached to an associated front power module.

A second embodiment of the multi-functional vehicular assembly includes any previous or subsequent embodiments wherein the frame of the multi-functional row assembly is foldable.

A subsequent embodiment of the multi-functional vehicular assembly includes any previous or subsequent embodiments wherein the turbine powered row tiller/cleaner assembly includes a cutting assembly, wherein the cutting assembly includes powered cutting blades and a ground powered disc.

A subsequent embodiment of the multi-functional vehicular assembly includes any previous or subsequent embodiments, wherein the turbine powered row tiller/cleaner assembly includes a drive which rotates the powered cutting blades.

A subsequent embodiment of the multi-functional vehicular assembly includes any previous or subsequent embodiments, wherein the drive of the turbine powered row tiller/cleaner assembly includes a first rotating bar, which transfers rotational movement to a first chain assembly including a pair of sprockets, which transfers rotational movement to a second rotating bar, which transfers rotational movement to a second chain assembly including a pair of sprockets, which transfers rotational movement to a third rotating bar, which drives a third chain assembly including a pair of sprockets, which transfers rotational movement to an axel which causes rotation of the cutting blade.

A subsequent embodiment of the multi-functional vehicular assembly includes any previous or subsequent embodiments, wherein the turbine powered row tiller/cleaner assembly includes a parallel link arm assembly attached on its first end to the first chain assembly and to the second chain assembly and attached to the third chain assembly on its second end.

A subsequent embodiment of the multi-functional vehicular assembly includes any previous or subsequent embodiments, wherein the parallel link arm assembly of the powered row tiller/cleaner assembly includes pivots at its link connection points which allow the parallel link arm assembly to rotate in a downward direction upon application of force.

A subsequent embodiment of the multi-functional vehicular assembly includes any previous or subsequent embodiments, wherein the parallel link arm assembly of the powered row tiller/cleaner includes a downforce adjusting cylinder assembly which allows the parallel link arm assembly to rotate in a downward direction upon application of force causing the turbine powered row tiller/cleaner assembly to engage the ground and which allows the parallel link arm assembly to rotate in an upward direction upon the release of force causing the turbine powered row tiller/cleaner assembly to raise up off the ground.

A subsequent embodiment of the multi-functional vehicular assembly includes any previous or subsequent embodiments, wherein a hood is positioned over the cutting blades of the turbine powered row tiller/cleaner assembly.

A subsequent embodiment of the multi-functional vehicular assembly includes any previous or subsequent embodiments, wherein the planter assembly is attached to the turbine powered roller tiller cleaner assembly through a parallel link arm assembly of the planter assembly and wherein the parallel link arm assembly.

A subsequent embodiment of the multi-functional vehicular assembly includes any previous or subsequent embodiments, wherein the parallel link arm assembly of the planter assembly includes pivots at its link connection points which allow the parallel link arm assembly to rotate in a downward direction upon application of force.

A subsequent embodiment of the multi-functional vehicular assembly includes any previous or subsequent embodiments, wherein the parallel link arm assembly of the planter assembly includes a downforce adjusting cylinder assembly which allows the parallel link arm assembly to rotate in a downward direction upon application of force causing the planter assembly to engage the ground and which allows the parallel link arm assembly to rotate in an upward direction upon the release of force causing the planter assembly to raise up off the ground.

A subsequent embodiment of the multi-functional vehicular assembly includes any previous or subsequent embodiments, wherein the planter assembly includes a hopper assembly, wherein the hopper assembly includes a line that transports seed for planting from a storage tank and a line which transports seed for planting from the hopper to the ground.

A subsequent embodiment of the multi-functional vehicular assembly includes any previous or subsequent embodiments, wherein the planter assembly includes a gauge wheel positioned below the hopper assembly for controlling the depth of the tilled soil.

A subsequent embodiment of the multi-functional vehicular assembly includes any previous or subsequent embodiments, wherein the planter assembly includes an opening wheel and a closing wheel positioned adjacent to each other in front of the gauge wheel.

A subsequent embodiment of the multi-functional vehicular assembly includes any previous or subsequent embodiments, wherein a packing wheel positioned in front of the opening wheel and the closing wheel.

A subsequent embodiment of the multi-functional vehicular assembly includes any previous or subsequent embodiments, wherein the multi-functional row assembly is attached to a front end of an associated front power module and a back end of an associated rear module.

A subsequent embodiment of the multi-functional vehicular assembly includes any previous or subsequent embodiments, wherein the multi-functional row assembly receives seed and fertilizer from a seed line and a fertilizer line through which seed and fertilizer is respectively pumped from at least two tanks for storing fertilizer and seed in the rear module.

A subsequent embodiment of the multi-functional vehicular assembly includes any previous or subsequent embodiments, wherein the multi-functional row assembly is capable of being raised off the ground or lowered to the ground through an operator controlled three-point hitch positioned on the back end of the rear module and at the front end of the front power module.

A subsequent embodiment of the multi-functional vehicular assembly includes any previous or subsequent embodiments, wherein the multi-functional row assembly positioned on the rear module travels in a path of direction created by the front power module and the associated rear module, wherein the rear module is not towed in that it includes a drive and steering transfer assembly that receives drive power and directional input from the front power module.

Provided below are various embodiments of a multi-functional row assembly for an associated vehicular assembly for farming.

A first embodiment of the multi-functional row assembly for an associated for farming includes: a plurality of individual row units mounted on a frame for tilling soil, planting seed and fertilizing planted seed, wherein each row unit includes a turbine powered row tiller/cleaner assembly and a planter assembly, wherein the turbine powered row tiller/cleaner assembly includes a cutting assembly, wherein the cutting assembly comprises powered cutting blades and a ground powered disc, wherein the turbine powered row tiller/cleaner assembly includes a drive which rotates the powered cutting blades, wherein the drive of the turbine powered row tiller/cleaner assembly includes a first rotating bar, a second rotating bar and a third rotating bar, and wherein the first rotating bar transfers rotational movement to a first chain assembly including a pair of sprockets, wherein the first chain assembly transfers rotational movement to a second rotating bar, wherein the second rotating bar transfers rotational movement to a second chain assembly including a pair of sprockets, wherein the second chain assembly transfers rotational movement to a third rotating bar, wherein the third rotating bar drives a third chain assembly including a pair of sprockets, and wherein the third chain assembly transfers rotational movement to an axel which causes rotation of the cutting blade.

A second embodiment of the multi-functional row assembly includes any previous or subsequent embodiments wherein the cutting blades rotate independent of a ground speed of the associated vehicular assembly and wherein the cutting blade and the drive of the turbine powered row tiller/cleaner assembly has a rotational speed that is capable of being set within the associated vehicular assembly.

A subsequent embodiment of the multi-functional row assembly includes any previous or subsequent embodiments wherein the cutting blades and the drive of the turbine powered row tiller/cleaner assembly has a rotational speed that is higher than the ground speed of the associated vehicular assembly.

A subsequent embodiment of the multi-functional row assembly includes any previous or subsequent embodiments wherein the frame is foldable.

A subsequent embodiment of the multi-functional row assembly includes any previous or subsequent embodiments wherein the turbine powered row tiller/cleaner assembly comprises a parallel link arm assembly having link connection points that attach a first end of the parallel link arm assembly to the first chain assembly and to the second chain assembly, and link connection points that attach a second end of the parallel link arm assembly to the second chain assembly and to the third chain assembly.

A subsequent embodiment of the multi-functional row assembly includes any previous or subsequent embodiments wherein the parallel link arm assembly of the powered row tiller/cleaner assembly includes pivots at its link connection points which allow the parallel link arm assembly to rotate in a downward and upward direction.

A subsequent embodiment of the multi-functional row assembly includes any previous or subsequent embodiments wherein the parallel link arm assembly of the powered row tiller/cleaner includes a downforce adjusting cylinder assembly which allows the parallel link arm assembly to rotate in a downward direction upon application of force causing the turbine powered row tiller/cleaner assembly to engage the ground and which allows the parallel link arm assembly to rotate in an upward direction upon the release of force causing the turbine powered row tiller/cleaner assembly to raise up off the ground.

A subsequent embodiment of the multi-functional row assembly includes any previous or subsequent embodiments wherein a hood is positioned over the cutting blades of the turbine powered row tiller/cleaner assembly.

A subsequent embodiment of the multi-functional row assembly includes any previous or subsequent embodiments wherein the planter assembly includes a parallel link arm assembly that attaches the planter assembly to the turbine powered roller tiller cleaner assembly.

A subsequent embodiment of the multi-functional row assembly includes any previous or subsequent embodiments wherein the parallel link arm assembly of the planter assembly includes: i) link connection points at a first end of the parallel link arm assembly to connect the parallel link arm assembly to the turbine powered row tiller/cleaner assembly and link connection points at a second end of the parallel link arm assembly to connect the parallel link arm assembly to the planter assembly and ii) pivots at its link connection points which allow the parallel link arm assembly of the planter assembly to rotate in a downward and upward direction.

A subsequent embodiment of the multi-functional row assembly includes any previous or subsequent embodiments wherein the parallel link arm assembly of the planter assembly includes a downforce adjusting cylinder assembly which allows the parallel link arm assembly to rotate in a downward direction upon application of force causing the planter assembly to engage the ground and which allows the parallel link arm assembly to rotate in an upward direction upon the release of force causing the planter assembly to raise up off the ground.

A subsequent embodiment of the multi-functional row assembly includes any previous or subsequent embodiments wherein the multi-functional row assembly includes a seed line and a fertilizer line through which seed and fertilizer are respectively pumped.

A subsequent embodiment of the multi-functional row assembly includes any previous or subsequent embodiments wherein the planter assembly includes a hopper assembly, wherein a first seed line extends from a storage tank in the associated vehicle assembly to the hopper assembly for transporting seed for planting to the hopper assembly and a second seed line which extends from the hopper assembly for transporting seed for planting from the hopper assembly to the ground.

A subsequent embodiment of the multi-functional row assembly includes any previous or subsequent embodiments wherein the planter assembly includes a gauge wheel positioned below the hopper assembly for controlling the depth of the tilled soil.

A subsequent embodiment of the multi-functional row assembly includes any previous or subsequent embodiments wherein the planter assembly includes an opening wheel and a closing wheel positioned adjacent to each other in front of the gauge wheel.

A subsequent embodiment of the multi-functional row assembly includes any previous or subsequent embodiments wherein the multi-functional row assembly includes a packing wheel positioned in front of the opening wheel and the closing wheel.

A subsequent embodiment of the multi-functional row assembly includes any previous or subsequent embodiments wherein the multi-functional row assembly is attached to: i) a front end of a front power module of the associated vehicular assembly; ii) a back end of a rear module that is attached to the front module of the associated vehicular assembly; or iii) a front end of a front power module of the associated vehicular assembly and a back end of a rear module that is attached to the front module of the associated vehicular assembly.

A subsequent embodiment of the multi-functional row assembly includes any previous or subsequent embodiments wherein the multi-functional row assembly includes a leading end multi-functional row assembly and a trailing end multi-functional row assembly for the associated vehicular assembly for farming, wherein the trailing end multi-functional row assembly includes a pan, wherein the pan is engaged to a front hinge mounted to the trailing end multi-functional row assembly and wherein the pan rests over at least one push bar engaged with the trailing end multi-functional row assembly.

A subsequent embodiment of the multi-functional row assembly includes any previous or subsequent embodiments wherein the leading end multi-functional row assembly is attached to a front end of a front power module of the associated vehicular assembly and the trailing end multi-functional row assembly is attached to a back end of a rear module that is attached to the front module of the associated vehicular assembly.

A subsequent embodiment of the multi-functional row assembly includes any previous or subsequent embodiments wherein the back end of the rear module includes a hopper and gate and a spreader.

A subsequent embodiment of the multi-functional row assembly includes any previous or subsequent embodiments wherein the multi-functional row assembly is capable of being raised off the ground or lowered to the ground through an operator controlled three-point hitch, wherein the operator controlled three-point hitch is positioned on the back end of the rear module and/or at the front end of the front power module of the associated vehicular assembly.

Also provided is a multi-functional row assembly for a vehicular assembly for farming, including any previous or subsequent embodiments which includes: a plurality of individual row units mounted on a frame for tilling soil, planting seed and fertilizing planted seed, wherein each row unit includes a turbine powered row tiller/cleaner assembly and a planter assembly, wherein the turbine powered row tiller/cleaner assembly includes a cutting assembly, wherein the cutting assembly includes powered cutting blades and a ground powered disc, wherein the turbine powered row tiller/cleaner assembly includes a drive which rotates the powered cutting blades, and wherein the drive of the turbine powered row tiller/cleaner assembly comprises a first bar and a first chain assembly, a second bar and a second chain assembly and a third bar and a third chain assembly.

A subsequent embodiment of the multi-functional row assembly includes any previous or subsequent embodiments wherein the first bar includes a first rotating bar, the second bar includes a second rotating bar and the third bar includes a third rotating bar, wherein the first rotating bar transfers rotational movement to the first chain assembly including a pair of sprockets, wherein the first chain assembly transfers rotational movement to the second rotating bar, wherein the second rotating bar transfers rotational movement to the second chain assembly including a pair of sprockets, wherein the second chain assembly transfers rotational movement to the third rotating bar, wherein the third rotating bar drives the third chain assembly including a pair of sprockets, and wherein the third chain assembly transfers rotational movement to an axel which causes rotation of the cutting blade.

A subsequent embodiment of the multi-functional row assembly includes any previous or subsequent embodiments wherein the turbine powered row tiller/cleaner assembly and the planter assembly each comprise a parallel link arm assembly, wherein the parallel link arm assembly of the turbine powered row tiller/cleaner assembly includes link connection points that attach a first end of the parallel link arm assembly to the first chain assembly and to the second chain assembly, and link connection points that attach a second end of the parallel link arm assembly to the second chain assembly and to the third chain assembly, wherein the parallel link arm assembly of the powered row tiller/cleaner assembly comprises pivots at its link connection points which allow the parallel link arm assembly to rotate in a downward and upward direction, wherein the parallel link arm assembly of the powered row tiller/cleaner comprises a downforce adjusting cylinder assembly which allows the parallel link arm assembly to rotate in a downward direction upon application of force causing the turbine powered row tiller/cleaner assembly to engage the ground and which allows the parallel link arm assembly to rotate in an upward direction upon the release of force causing the turbine powered row tiller/cleaner assembly to raise up off the ground, wherein the parallel link arm assembly of the planter assembly mechanically connects the turbine powered roller tiller cleaner assembly to the planter assembly, wherein the parallel link arm assembly of the planter assembly includes: i) link connection points at a first end of the parallel link arm assembly to connect the parallel link arm assembly to the turbine powered row tiller/cleaner assembly and link connection points at a second end of the parallel link arm assembly to connect the parallel link arm assembly to the planter assembly and ii) pivots at its link connection points which allow the parallel link arm assembly of the planter assembly to rotate in a downward and upward direction, and wherein the parallel link arm assembly of the planter assembly includes a downforce adjusting cylinder assembly which allows the parallel link arm assembly to rotate in a downward direction upon application of force causing the planter assembly to engage the ground and which allows the parallel link arm assembly to rotate in an upward direction upon the release of force causing the planter assembly to raise up off the ground.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the metric system and all amounts and percentages are by weight, unless otherwise expressly indicated. Also, all citations referred herein are expressly incorporated herein by reference.

What is claimed is:

1. A multi-functional row assembly for an associated vehicular assembly for farming comprising:

a plurality of individual row units mounted on a frame for tilling soil, planting seed and fertilizing planted seed, wherein each row unit comprises a turbine powered row tiller/cleaner assembly and a planter assembly, wherein the turbine powered row tiller/cleaner assembly comprises a cutting assembly, wherein the cutting assembly comprises powered cutting blades and a ground powered disc, wherein the turbine powered row tiller/cleaner assembly comprises a drive which rotates the powered cutting blades, wherein the drive of the turbine powered row tiller/cleaner assembly comprises a first rotating bar, a second rotating bar and a third rotating bar, and wherein the first rotating bar transfers rotational movement from the turbine to a first chain assembly including a pair of sprockets, wherein the first chain assembly transfers rotational movement to the second rotating bar, wherein the second rotating bar transfers rotational movement to a second chain assembly including a pair of sprockets, wherein the second chain assembly transfers rotational movement to the third rotating bar, wherein the third rotating bar drives a third chain assembly including a pair of sprockets, and wherein the third chain assembly transfers rotational movement to an axel which causes rotation of the cutting blades.

2. The multi-functional row assembly of claim 1, wherein the cutting blades rotate independent of a ground speed of the associated vehicular assembly and wherein the cutting blade and the drive of the turbine powered row tiller/cleaner assembly has a rotational speed that is capable of being set within the associated vehicular assembly.

3. The multi-functional row assembly of claim 1, wherein the cutting blades and the drive of the turbine powered row tiller/cleaner assembly has a rotational speed that is higher than the ground speed of the associated vehicular assembly.

4. The multi-functional row assembly of claim 1, wherein the frame is foldable.

5. The multi-functional row assembly of claim 4, wherein the turbine powered row tiller/cleaner assembly comprises a parallel link arm assembly having link connection points that attach a first end of the parallel link arm assembly to the first chain assembly and to the second chain assembly, and link connection points that attach a second end of the parallel link arm assembly to the second chain assembly and to the third chain assembly.

6. The multi-functional row assembly of claim 5, wherein the parallel link arm assembly of the powered row tiller/cleaner assembly comprises pivots at its link connection points which allow the parallel link arm assembly to rotate in a downward and upward direction.

7. The multi-functional row assembly of claim 6, wherein the parallel link arm assembly of the powered row tiller/cleaner comprises a downforce adjusting cylinder assembly which allows the parallel link arm assembly to rotate in a downward direction upon application of force causing the turbine powered row tiller/cleaner assembly to engage the ground and which allows the parallel link arm assembly to rotate in an upward direction upon the release of force causing the turbine powered row tiller/cleaner assembly to raise up off the ground.

8. The multi-functional row assembly of claim 7, wherein a hood is positioned over the cutting blades of the turbine powered row tiller/cleaner assembly.

9. The multi-functional row assembly of claim 8, wherein the planter assembly comprises a parallel link arm assembly that attaches the planter assembly to the turbine powered roller tiller cleaner assembly.

10. The multi-functional row assembly of claim 9, wherein the parallel link arm assembly of the planter assembly comprises: i) link connection points at a first end of the parallel link arm assembly to connect the parallel link arm assembly to the turbine powered row tiller/cleaner assembly and link connection points at a second end of the parallel link arm assembly to connect the parallel link arm assembly to the planter assembly and ii) pivots at its link connection points which allow the parallel link arm assembly of the planter assembly to rotate in a downward and upward direction.

11. The multi-functional row assembly of claim 10, wherein the parallel link arm assembly of the planter assembly comprises a downforce adjusting cylinder assembly which allows the parallel link arm assembly to rotate in a downward direction upon application of force causing the planter assembly to engage the ground and which allows the parallel link arm assembly to rotate in an upward direction upon the release of force causing the planter assembly to raise up off the ground.

12. The multi-functional row assembly of claim 11, wherein the multi-functional row assembly comprises a seed line through which seed is pumped.

13. The multi-functional row assembly of claim 12, wherein the multi-functional row assembly comprises a fertilizer line through which fertilizer is pumped.

14. The multi-functional row assembly of claim 12, wherein the planter assembly comprises a hopper assembly, wherein a first seed line extends from a storage tank in the associated vehicle assembly to the hopper assembly for transporting seed for planting to the hopper assembly and a second seed line which extends from the hopper assembly for transporting seed for planting from the hopper assembly to the ground.

15. The multi-functional row assembly of claim 14, wherein the planter assembly comprises a gauge wheel positioned below the hopper assembly for controlling the depth of the tilled soil.

16. The multi-functional row assembly of claim 15, wherein the planter assembly comprises an opening wheel and a closing wheel positioned adjacent to each other in front of the gauge wheel.

17. The multi-functional row assembly of claim 16 comprising a packing wheel positioned in front of the opening wheel and the closing wheel.

18. The multi-functional row assembly of claim 17 comprising a leading end multi-functional row assembly and a trailing end multi-functional row assembly for the associated vehicular assembly for farming, wherein the trailing end multi-functional row assembly comprises a pan, wherein the pan is engaged to a front hinge mounted to the trailing end multi-functional row assembly and wherein the pan rests over at least one push bar engaged with the trailing end multi-functional row assembly.

19. The multi-functional row assembly of claim 18, wherein the leading end multi-functional row assembly is attached to a front end of a front power module of the associated vehicular assembly and the trailing end multi-functional row assembly is attached to a back end of a rear module that is attached to the front module of the associated vehicular assembly.

20. The multi-functional row assembly of claim 19, wherein the back end of the rear module comprises a hopper and gate and a spreader.

21. The multi-functional row assembly of claim 20, wherein the multi-functional row assembly is capable of being raised off the ground or lowered to the ground through an operator controlled three-point hitch, wherein the operator controlled three-point hitch is positioned on the back end of the rear module and/or at the front end of the front power module of the associated vehicular assembly.

22. A multi-functional row assembly for a vehicular assembly having an associated turbine for farming comprising:

a plurality of individual row units mounted on a frame for tilling soil, planting seed and fertilizing planted seed, wherein each row unit comprises a turbine powered row tiller/cleaner assembly and a planter assembly, wherein the turbine powered row tiller/cleaner assembly comprises a cutting assembly, wherein the cutting assembly comprises powered cutting blades and a ground powered disc, wherein the turbine powered row tiller/cleaner assembly comprises a drive which rotates the powered cutting blades, and wherein the drive of the turbine powered row tiller/cleaner assembly comprises a first bar and a first chain assembly, a second bar and a second chain assembly and a third bar and a third chain assembly, wherein the drive transfers power from the turbine to rotate the cutting blades.

23. The multi-functional row assembly of claim 22, wherein the first bar comprises a first rotating bar, the second bar comprises a second rotating bar and the third bar comprises a third rotating bar, wherein the first rotating bar transfers rotational movement to the first chain assembly including a pair of sprockets, wherein the first chain assembly transfers rotational movement to the second rotating bar, wherein the second rotating bar transfers rotational movement to the second chain assembly including a pair of sprockets, wherein the second chain assembly transfers rotational movement to the third rotating bar, wherein the third rotating bar drives the third chain assembly including a pair of sprockets, and wherein the third chain assembly transfers rotational movement to an axel which causes rotation of the cutting blades.

24. The multi-functional row assembly of claim 23, wherein the turbine powered row tiller/cleaner assembly and the planter assembly each comprise a parallel link arm assembly, wherein the parallel link arm assembly of the turbine powered row tiller/cleaner assembly comprises link connection points that attach a first end of the parallel link arm assembly to the first chain assembly and to the second chain assembly, and link connection points that attach a second end of the parallel link arm assembly to the second chain assembly and to the third chain assembly, wherein the parallel link arm assembly of the powered row tiller/cleaner assembly comprises pivots at its link connection points which allow the parallel link arm assembly to rotate in a downward and upward direction, wherein the parallel link arm assembly of the powered row tiller/cleaner comprises a downforce adjusting cylinder assembly which allows the parallel link arm assembly to rotate in a downward direction upon application of force causing the turbine powered row tiller/cleaner assembly to engage the ground and which allows the parallel link arm assembly to rotate in an upward direction upon the release of force causing the turbine powered row tiller/cleaner assembly to raise up off the ground, wherein the parallel link arm assembly of the planter assembly mechanically connects the turbine powered roller tiller cleaner assembly to the planter assembly, wherein the parallel link arm assembly of the planter assembly comprises: i) link connection points at a first end of the parallel link arm assembly to connect the parallel link arm assembly to the turbine powered row tiller/cleaner assembly and link connection points at a second end of the parallel link arm assembly to connect the parallel link arm assembly to the planter assembly and ii) pivots at its link connection points which allow the parallel link arm assembly of the planter assembly to rotate in a downward and upward direction, and wherein the parallel link arm assembly of the planter assembly comprises a downforce adjusting cylinder assembly which allows the parallel link arm assembly to rotate in a downward direction upon application of force causing the planter assembly to engage the ground and which allows the parallel link arm assembly to rotate in an upward direction upon the release of force causing the planter assembly to raise up off the ground.

* * * * *